United States Patent

Cole et al.

[11] Patent Number: 6,109,412
[45] Date of Patent: Aug. 29, 2000

[54] AUTOMATICALLY ADJUSTING FRICTION CLUTCH WITH OVER ADJUSTMENT PROTECTION AND RESET MECHANISM

[76] Inventors: Christopher D. Cole, 4807 Moncalm Ct., Fort Wayne, Ind. 46801; Daniel V. Gochenour, 1411 Davidson Ct., Auburn, Ind. 46706; Martin E. Kummer, 813 Ruth St., Auburn, Ind. 46706; Mark Jennings, 205 Hunters Ridge, Auburn, Ind. 46706

[21] Appl. No.: 08/993,614

[22] Filed: Dec. 18, 1997

Related U.S. Application Data

[63] Continuation-in-part of application No. 08/748,702, Nov. 13, 1996, Pat. No. 5,934,429.

[51] Int. Cl.$^7$ .................................................. F16D 13/75
[52] U.S. Cl. ..................................... 192/70.25; 192/111 A
[58] Field of Search .............................. 192/70.25, 111 A

[56] References Cited

U.S. PATENT DOCUMENTS

| | | |
|---|---|---|
| 4,191,285 | 3/1980 | Thelander, Sr. et al. . |
| 4,207,972 | 6/1980 | Zeidler ................................ 192/111 A |
| 4,228,883 | 10/1980 | Palmer . |
| 4,684,002 | 8/1987 | Takeuchi ............................. 192/70.25 |
| 5,069,322 | 12/1991 | Mizukami et al. . |
| 5,090,537 | 2/1992 | Fukuda ............................ 192/70.25 X |
| 5,377,803 | 1/1995 | Link et al. ......................... 192/111 A |
| 5,404,979 | 4/1995 | Craft et al. ......................... 192/70.25 |
| 5,419,418 | 5/1995 | Uenohara et al. .................. 192/70.25 |
| 5,450,934 | 9/1995 | Maucher ............................ 192/70.25 |
| 5,494,143 | 2/1996 | Simmonds . |
| 5,513,735 | 5/1996 | Uenohara ........................... 192/70.25 |
| 5,513,736 | 5/1996 | Mizukami . |
| 5,560,463 | 10/1996 | Link et al. .......................... 192/70.25 |
| 5,566,804 | 10/1996 | Gochenour et al. . |
| 5,570,768 | 11/1996 | Uenohara et al. .................. 192/70.25 |
| 5,634,541 | 6/1997 | Maucher ............................ 192/111 A |
| 5,645,154 | 7/1997 | Weidinger ......................... 192/70.25 |
| 5,690,203 | 11/1997 | Link et al. ......................... 192/70.25 |
| 5,695,036 | 12/1997 | Gochenour et al. ............... 192/70.25 |
| 5,791,448 | 8/1998 | Gochenour et al. ............... 192/70.25 |
| 5,904,233 | 5/1999 | Hashimoto ......................... 192/70.25 |
| 5,911,293 | 6/1999 | Weiss et al. ....................... 192/70.25 |
| 5,921,365 | 7/1999 | Bayer ............................ 192/70.25 X |
| 5,934,429 | 8/1999 | Jennings ............................ 192/70.25 |
| 5,941,356 | 8/1999 | Weisse et al. ..................... 192/70.25 |
| 5,979,628 | 5/1999 | Lampe et al. ..................... 192/70.25 |

*Primary Examiner*—Rodney H. Bonck
*Attorney, Agent, or Firm*—Dykema Gossett PLLC

[57] ABSTRACT

An adjustment mechanism for a frictional clutch for a motor vehicle includes a pressure plate, a first annular cam member, a second annular cam member, a cam spring, a cam control finger, an anti-rotation feature, and a control finger drag spring. The pressure plate has an axis of rotation and an engagement surface substantially normal to the axis of rotation. The first annular cam member is concentric with the axis of rotation and has a plurality of first ramped cam surfaces. The first annular cam member is rotatively fixed with respect to the pressure plate. The second annular cam member is rotatable relative to the first annular cam member and has a plurality of second ramped cam surfaces in engagement with the first ramped cam surfaces. The second annular cam member, together with the first annular cam member, define an effective pressure plate thickness. The second annular cam member also has an engagement step at its outer periphery. The cam spring is functionally disposed between the cam members and rotatively biases the cam members toward an increased cam height. The cam control finger is slidably disposed within an aperture in the pressure plate. The cam control finger has a shank portion which is disposed in the aperture in the pressure plate and is axially oriented for axial slidable displacements relative to the pressure plate. The cam control finger also includes an engaging portion radially extending from the shank portion and in engagement with the second annular cam member. The anti-rotation feature engages the finger thereby preventing rotation of the finger relative to the pressure plate. The control finger drag spring biases the finger into engagement with the side of the aperture and induces a frictional drag force resisting axial displacement of the control finger.

10 Claims, 13 Drawing Sheets

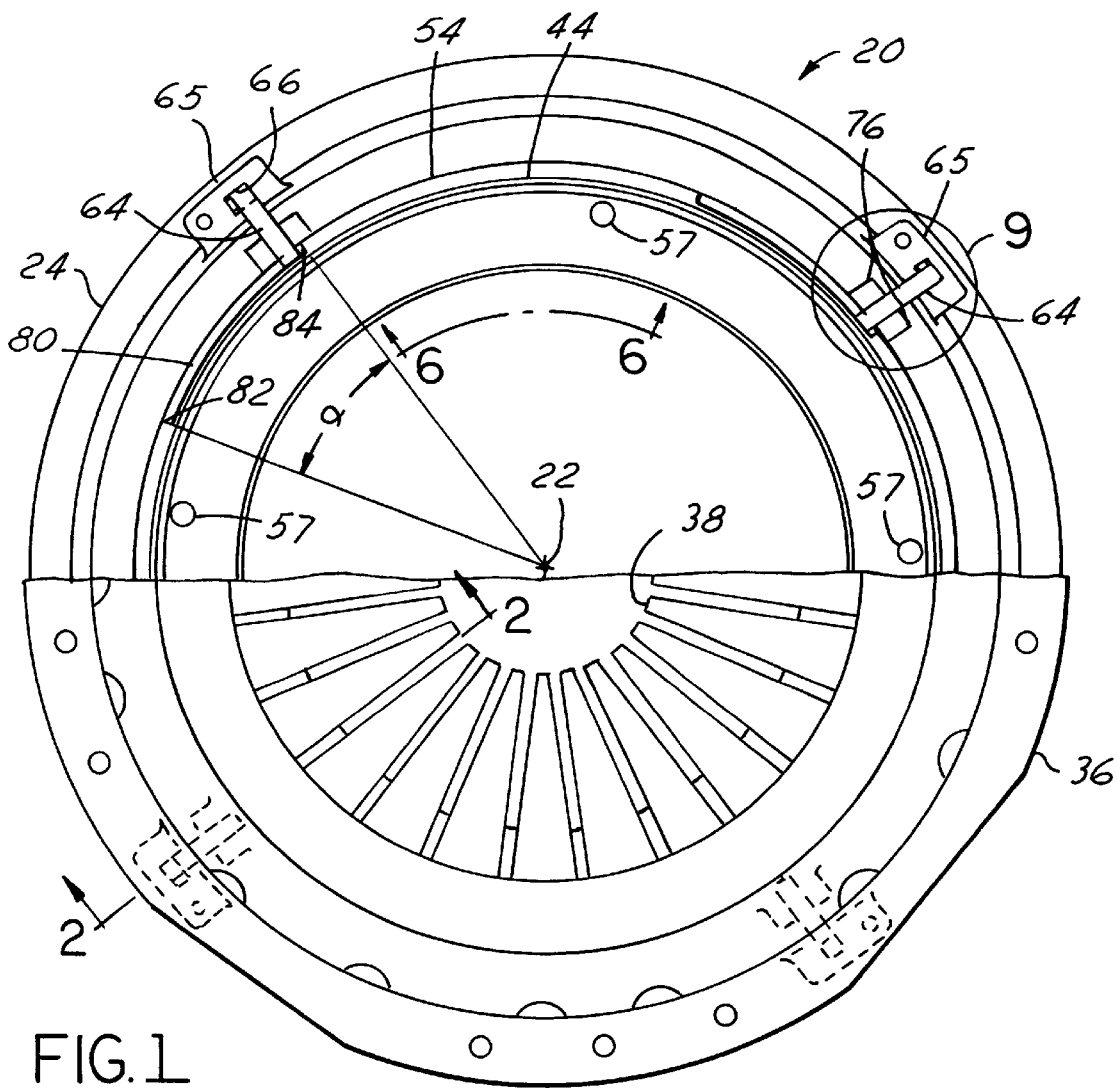
FIG. 1
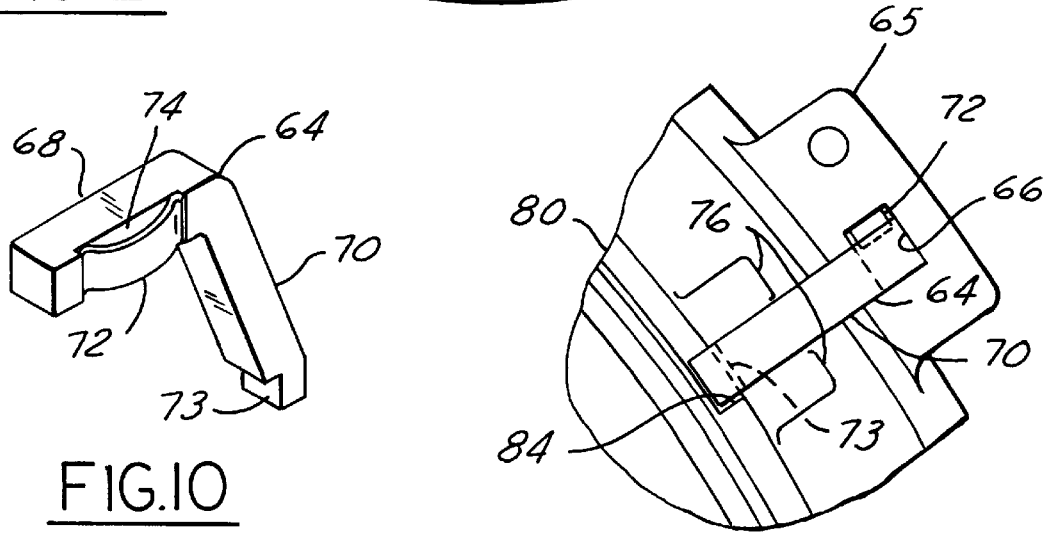
FIG. 10
FIG. 9

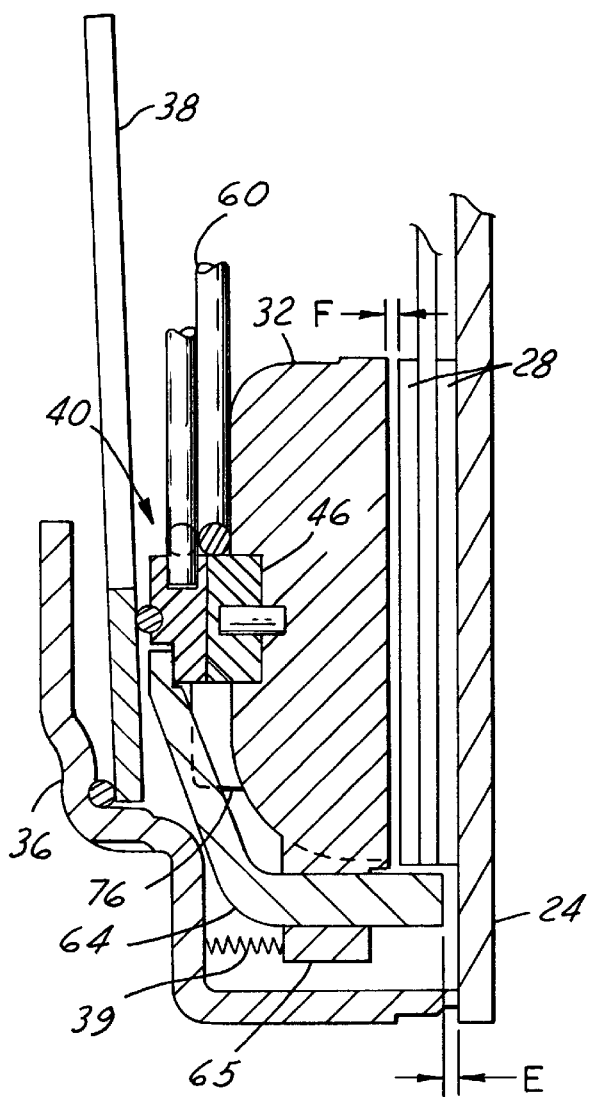
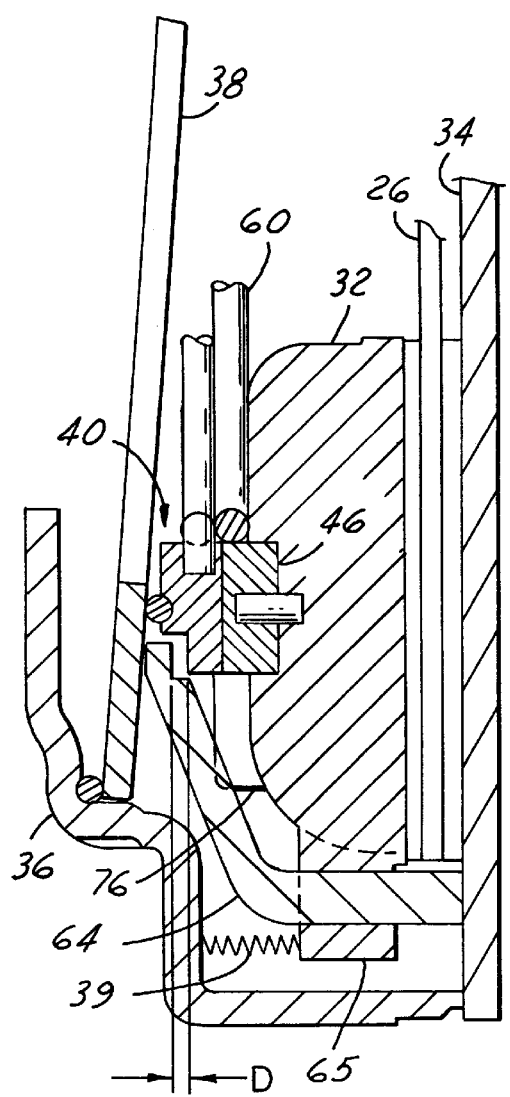
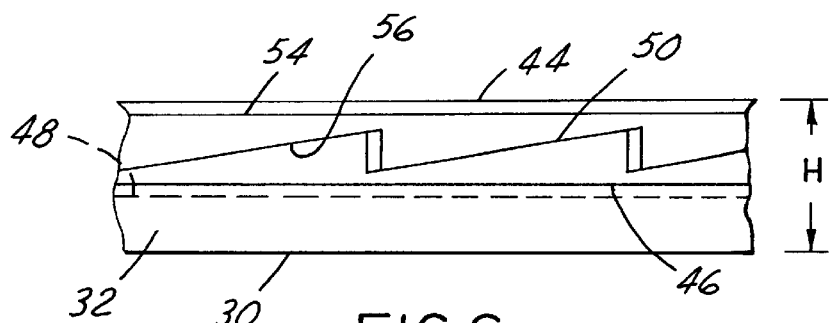
FIG. 5
FIG. 4
FIG. 6

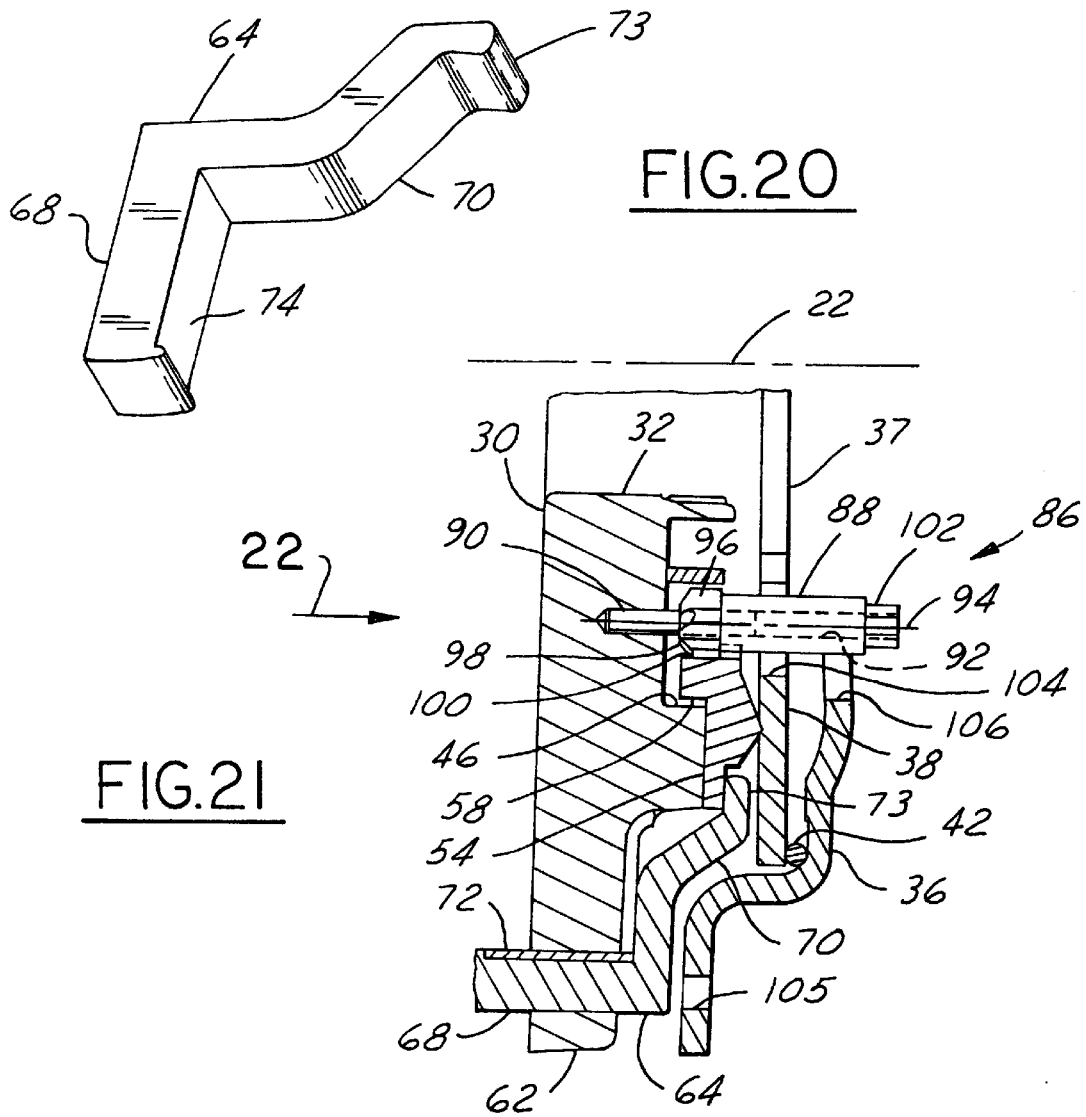
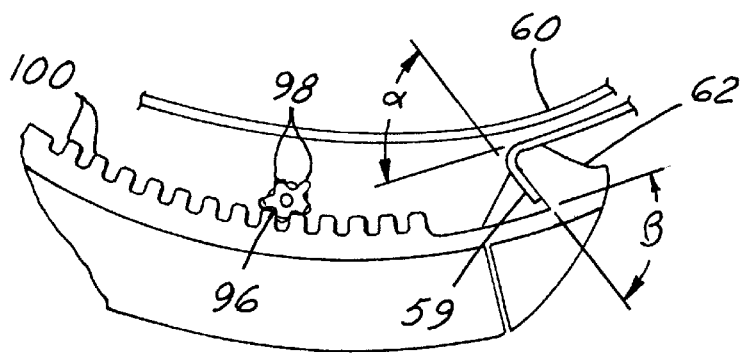

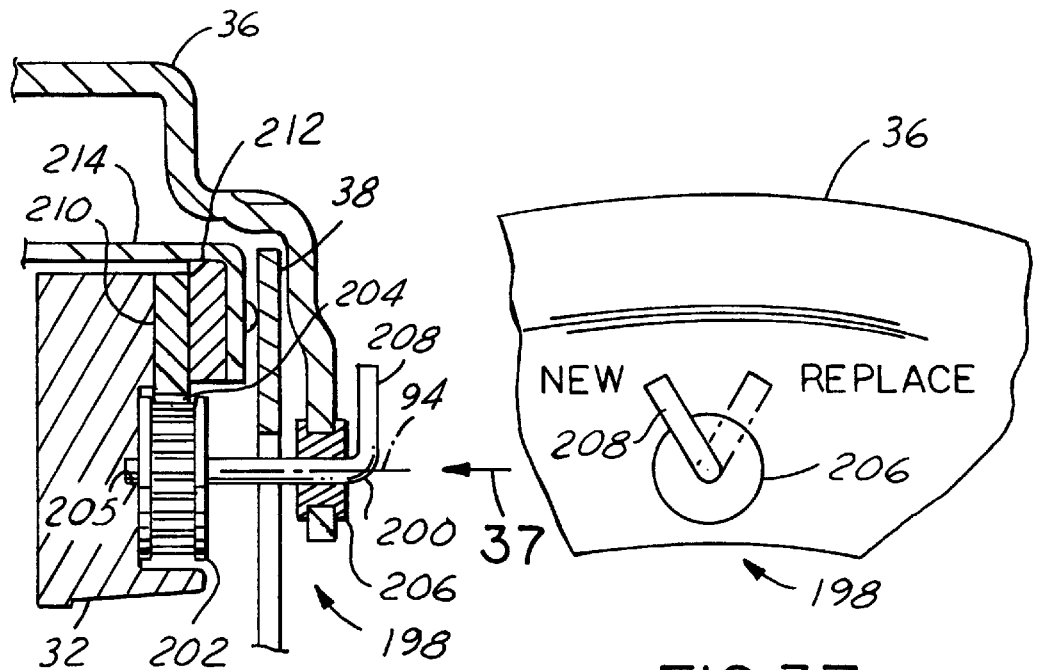
FIG. 36
FIG. 37
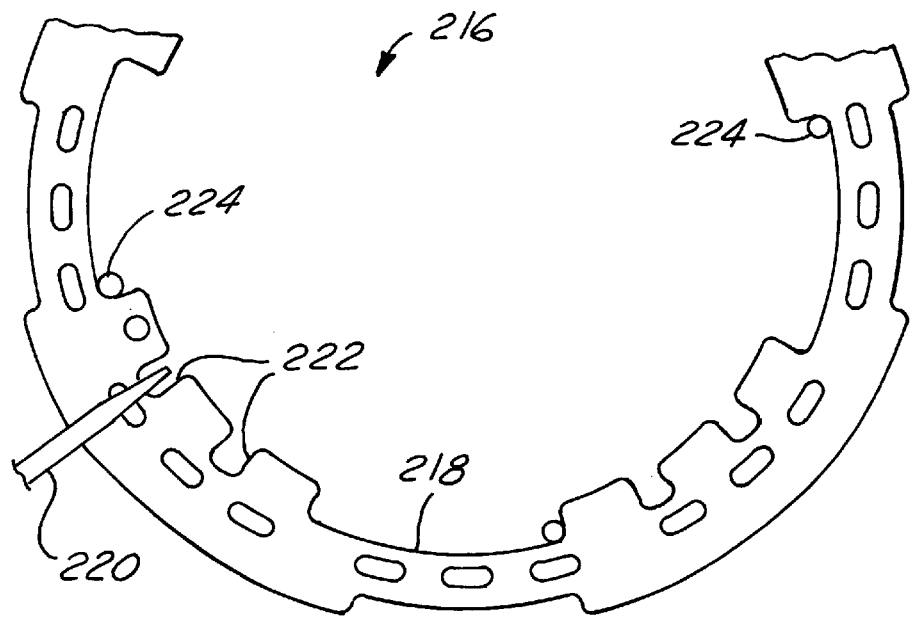
FIG. 38

AUTOMATICALLY ADJUSTING FRICTION CLUTCH WITH OVER ADJUSTMENT PROTECTION AND RESET MECHANISM

This application is a continuation-in-part of U.S. patent application Ser. No. 08/748,702 entitled "Automatically Adjusting Friction Clutch With Cam Locating Fingers" and filed on Nov. 13, 1996, now U.S. Pat. No. 5,934,429.

FIELD OF THE INVENTION

This invention relates to the field of friction clutches and more particularly to friction clutches having automatic adjustment mechanisms.

BACKGROUND OF THE INVENTION

Known friction clutches provide a releasable torsional connection between a motor vehicle engine flywheel and an associated transmission. Such clutches require adjustment of the clutch pressure plate's released position relative to the flywheel to ensure that complete engagement of the friction clutch can be achieved after the friction material of the clutch driven disc begins to wear. Some clutches are provided with automatic adjustment mechanisms which are disposed between the pressure plate and an associate biasing member such as a diaphragm spring. The clutch engagement force provided by the biasing member in the engaged condition prevents adjustment of the adjustment mechanism. However, when the clutch is released, excessive adjustment of the clutch may occur, particularly if the biasing member separates from the pressure plate. It is known to provide elements connected to the pressure plate which limits adjustment. However, adjusters which have such a limiting element typically also require complete disengagement of the biasing member from the pressure plate before adjustment occurs. This requirement of complete disengagement results in adjustment occurring only periodically, when the clutch pedal is fully depressed.

It is therefore desired to provide an adjustment limiting device which allows for continuous automatic adjustment with each clutch pedal stroke while preventing over adjustment for automatic adjustment mechanisms. It is further desired to provide a limiting device comprising a minimal number of parts.

Another concern is with the difficulty of resetting adjustment mechanisms. Some types of adjustment mechanisms may require disassembly of the pressure plate from the cover to reset the adjustment mechanism. When a worn driven disc is replaced, it is highly desirably to reset the adjustment mechanism to a new or unworn position from a worn position without disassembling the pressure plate from the cover.

It is desired to provide a clutch having an easy-to-use reset mechanism which enables the adjustment mechanism to reset the adjustment mechanism from a worn position to a new or unworn position.

SUMMARY OF THE INVENTION

The disclosed automatically adjusting friction clutch includes a limiting device which allows for continuous automatic adjustment with each clutch pedal stroke while preventing over adjustment. Further, a limiting device for use with the automatic adjustment device comprises a minimal number of parts. Also disclosed is an easy-to-use reset mechanism which enables resetting the automatic adjustment device from a worn position to a new or unworn position without separating the clutch cover from the pressure plate.

An adjustment mechanism for a frictional clutch for a motor vehicle includes a pressure plate, a first annular cam member, a second annular cam member, a cam spring, a cam control finger, an anti-rotation feature, and a control finger drag spring. The pressure plate has an axis of rotation and an engagement surface substantially normal to the axis of rotation. The first annular cam member is concentric with the axis of rotation and has a plurality of first ramped cam surfaces. The first annular cam member is rotatively fixed with respect to the pressure plate. The second annular cam member is rotatable relative to the first annular cam member and has a plurality of second ramped cam surfaces in engagement with the first ramped cam surfaces. The second annular cam member, together with the first annular cam member, define an effective pressure plate thickness. The second annular cam member also has an engagement step at its outer periphery. The cam spring is functionally disposed between the cam members and rotatively biases the cam members toward an increased cam height. The cam control finger is slidably disposed within an aperture in the pressure plate. The cam control finger has a shank portion which is disposed in the aperture in the pressure plate and is axially oriented for axial slidable displacements relative to the pressure plate. The cam control finger also includes an engaging portion radially extending from the shank portion and in engagement with the second annular cam member. The anti-rotation feature engages the finger thereby preventing rotation of the finger relative to the pressure plate. The control finger drag spring biases the finger into engagement with the side of the aperture and induces a frictional drag force resisting axial displacement of the control finger.

A frictional clutch for a motor vehicle includes a cover, a pressure plate, a first biasing member, a second biasing member, a first annular cam member, a second annular cam member, a cam spring, a cam control finger, an anti-rotation feature and a control finger drag spring. The pressure plate is coupled to the cover for rotation therewith about an axis and has a frictional engagement surface substantially normal to the axis. The first biasing member is interposed between the cover and the pressure plate and is selectively moveable between engaged and disengaged positions. In the engaged position, the first biasing member biases the pressure plate to an engaged pressure plate position. The second biasing member rotatably couples the pressure plate with the cover. The second biasing member biases the pressure plate toward the cover. The first annular cam member is centered about the axis and is rotatably fixed relative to the pressure plate. The first annular cam member has a plurality of first ramped cam surfaces. The second annular cam member is centered about the axis and is rotatable relative to the first annular cam member. The second annular cam member has a plurality of second ramped cam surfaces engaging the first ramped cam surfaces. The engaged cam members are axially disposed between the pressure plate and the first biasing member. The engaged cam members define an effective thickness of the pressure plate from the frictional engagement surface to an engagement feature of the second annular cam with the thickness increasing with relative rotation of the cams in a first direction. The second annular cam member also has an engagement step at an outer periphery thereof, the step having an included angle at least as great as the anticipated rotation of the second annular cam member. The cam spring is disposed between the cam members and induces relative rotation therebetween in the first direction. The cam control finger is slidably disposed within an aperture in the pressure plate and has a shank portion and an engaging portion. The shank portion is disposed in the aperture in the pressure plate and is axially oriented for axial displacement relative to the pressure plate. The engaging portion extends radially from the shank portion and engages the second annular cam member. The anti-rotation feature engages the finger and comprises part of the pressure plate. The anti-rotation feature prevents rotation of the finger relative to the pressure plate. The control finger drag spring is disposed substantially within the aperture and biases the finger into engagement with a side of the aperture. The control finger drag spring induces a frictional drag force resisting axial displacement of the control finger. The drag force is sufficient to resist axially biasing forces attributable to the cam spring, but is not sufficient to withstand a force attributable to the first biasing member.

BRIEF DESCRIPTION OF THE DRAWINGS

FIG. 1 is an end view of a clutch with its cover and diaphragm spring partially broken away to show an adjustment mechanism.

FIG. 4 is a sectional view of the clutch in FIG. 2 in the engaged condition evidencing wear of the driven disc.

FIG. 5 is a sectional view of the clutch in FIG. 4 in the released position and also evidencing wear of the driven disc.

FIG. 6 is a broken-out view of the cams in the direction of arrows 6 of FIG. 1.

FIG. 9 is an enlarged, broken-out portion of FIG. 1 in circle 9.

FIG. 10 is an enlarged perspective view of a cam control finger and spring.

FIG. 20 is an enlarged perspective view of an alternative embodiment of the cam control finger.

FIG. 21 is the sectional view of the clutch of FIG. 12 with a reset driver.

FIG. 22 is a partial broken-out view of selected components from FIG. 21 in the direction of arrow 22.

FIG. 36 is a sectional view of the clutch of FIG. 23 having an alternative reset mechanism.

FIG. 37 is an end view of the clutch of FIG. 36 in the direction of arrow 37.

FIG. 38 is a broken-out view of key components of an alternative reset mechanism for a clutch.

DESCRIPTION OF PREFERRED EMBODIMENTS

Figure 2:
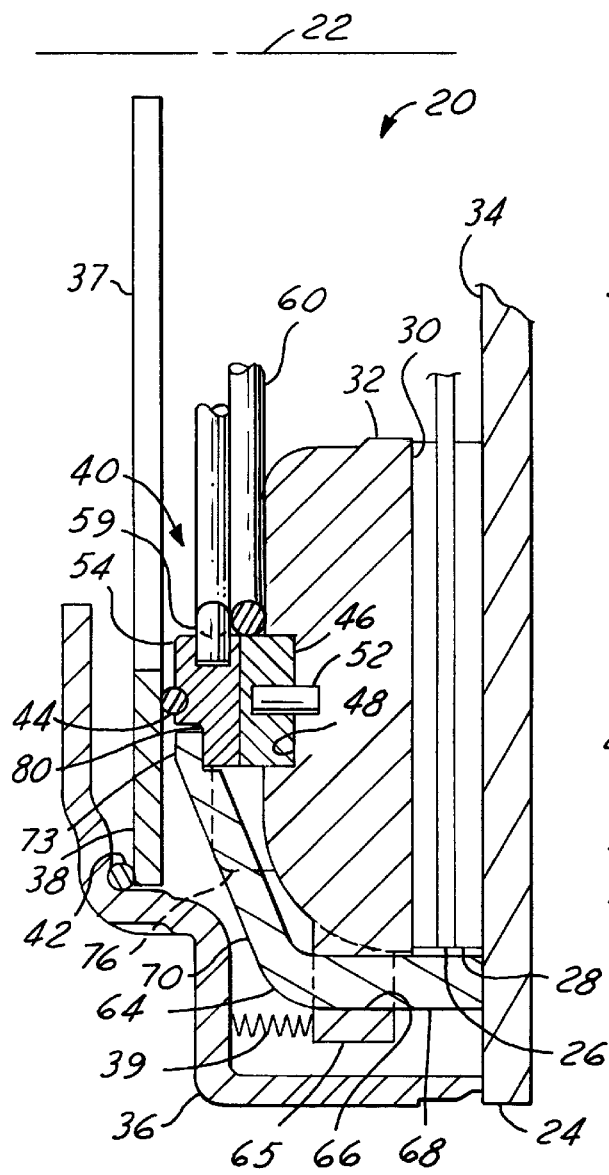
FIG. 2 is a sectional view in the direction of arrows 2 of FIG. 1 with the clutch engaged and evidencing no wear of the driven disc.
Figure 11:
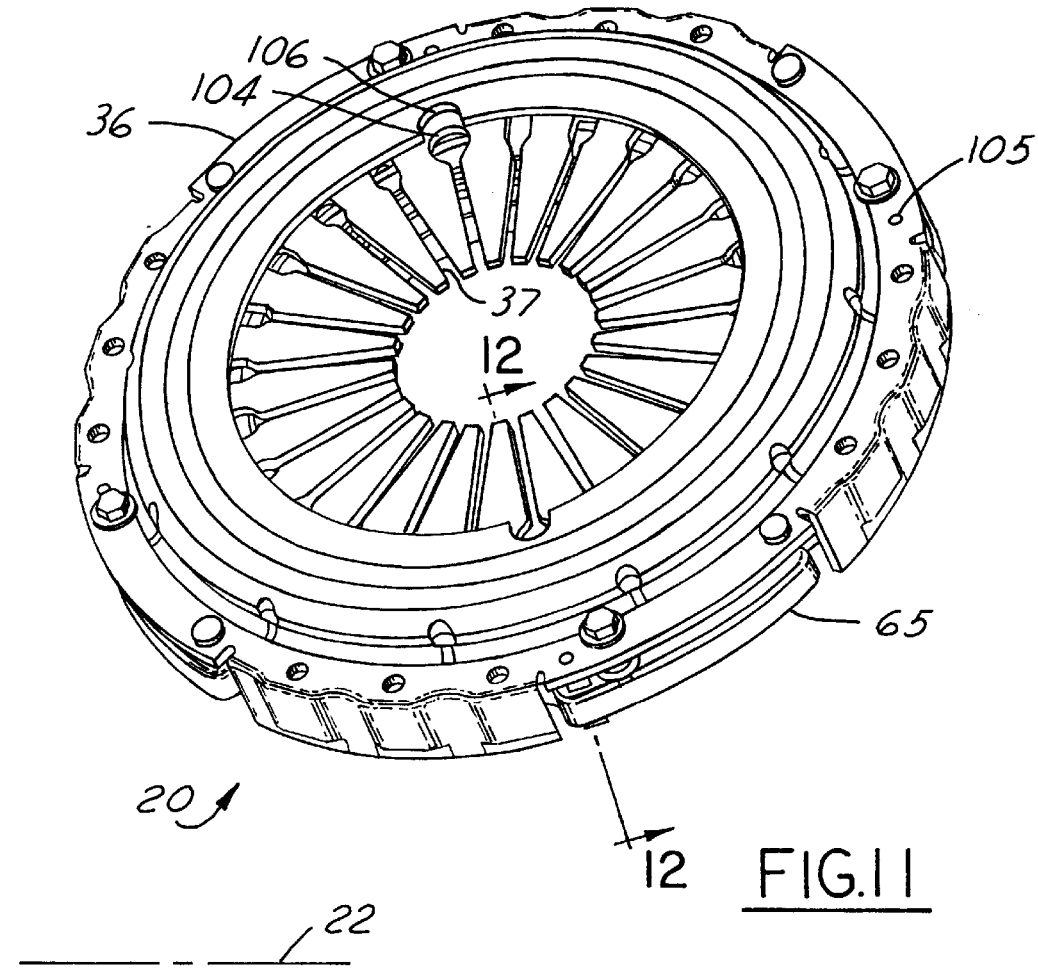
FIG. 11 is a detailed perspective view of the clutch.

A frictional clutch 20 for a motor vehicle is shown in FIG. 1. A more detailed perspective view of clutch 20 is shown in FIG. 11. Clutch 20 rotates about axis 22. A flywheel 24, shown in FIG. 2, is rotatably fixed to an output shaft of a motor vehicle engine (not shown). A driven disc 26 centered with respect to axis 22, has a hub (not shown) which engages an input shaft of the motor vehicle transmission (not shown). A friction element 28 of driven disc 26 is engaged by an engagement surface 30 of pressure plate 32 on one side and by an engagement surface 34 of flywheel 24 on the other side.

Figure 13:
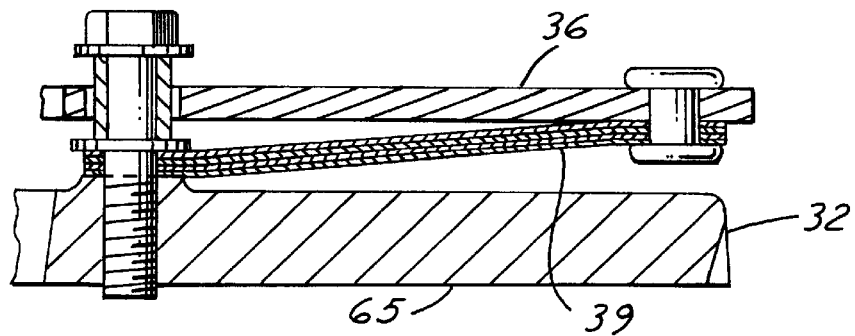
FIG. 13 is a broken-out sectional view of a connection between the pressure plate and the clutch cover.

A cover 36, shown partially broken away in FIG. 1, is disposed over pressure plate 32 and is fixed to flywheel 24 as is best shown in FIGS. 2–5. A diaphragm spring 38 with a plurality of radially inwardly extending fingers serves as a biasing member, and is disposed between cover 36 and pressure plate 32. Spring 38 forces pressure plate 32 against driven disc 26 which in turn is pressed against flywheel engagement surface 34 in an engaged condition. Fingers 37 of diaphragm spring 38 have their inner tips axially engaged by a release bearing (not shown). Clutch 20 is selectively moved between engaged and released conditions by axially displacing the release bearing which resultantly deflects diaphragm spring 38. A potential alternative to diaphragm spring 38 is a plurality of clutch levers disposed between cover 36 and pressure plate 32, with either a diaphragm spring without fingers, or a plurality of coil springs, acting against the levers to bias pressure plate 32 toward flywheel 24. A leaf spring 39 connecting pressure plate 32 and cover 36, shown schematically in FIGS. 2–5 and in section in FIG. 13, biases pressure plate 32 toward cover 36. An automatic adjustment mechanism 40 is disposed between pressure plate 32 and diaphragm spring 38.

Diaphragm spring 38 engages both cover 36 and adjustment mechanism 40 indirectly by contact with a first or outer diameter pivot ring 42 and a second or inner diameter pivot ring 44 respectively. First pivot ring 42 is disposed inside cover 36 and a second pivot ring 44 is centered over automatic adjustment mechanism 40.

Figure 3:
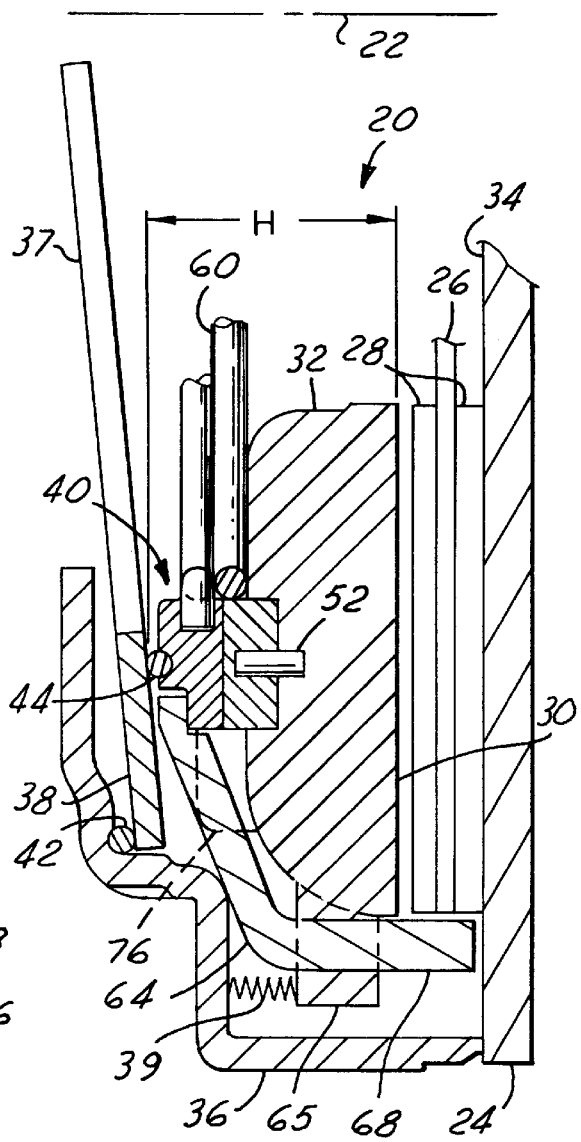
FIG. 3 is a sectional view of the clutch in FIG. 2 in the released condition.
Figure 12:
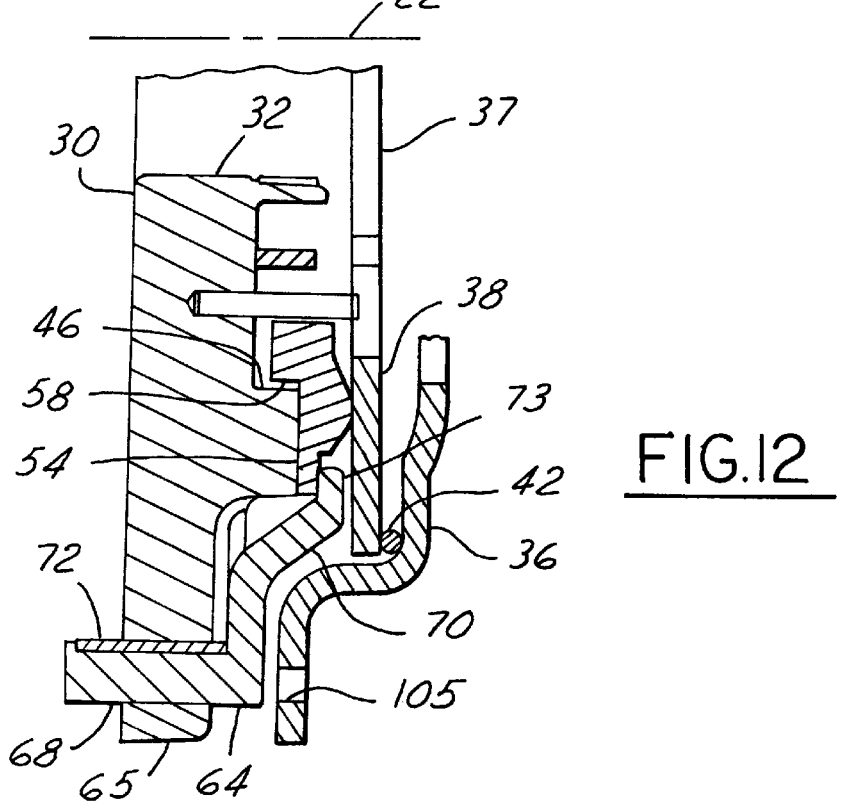
FIG. 12 is a sectional view of the clutch of FIG. 11 in the direction of arrows 12.
Figure 19:
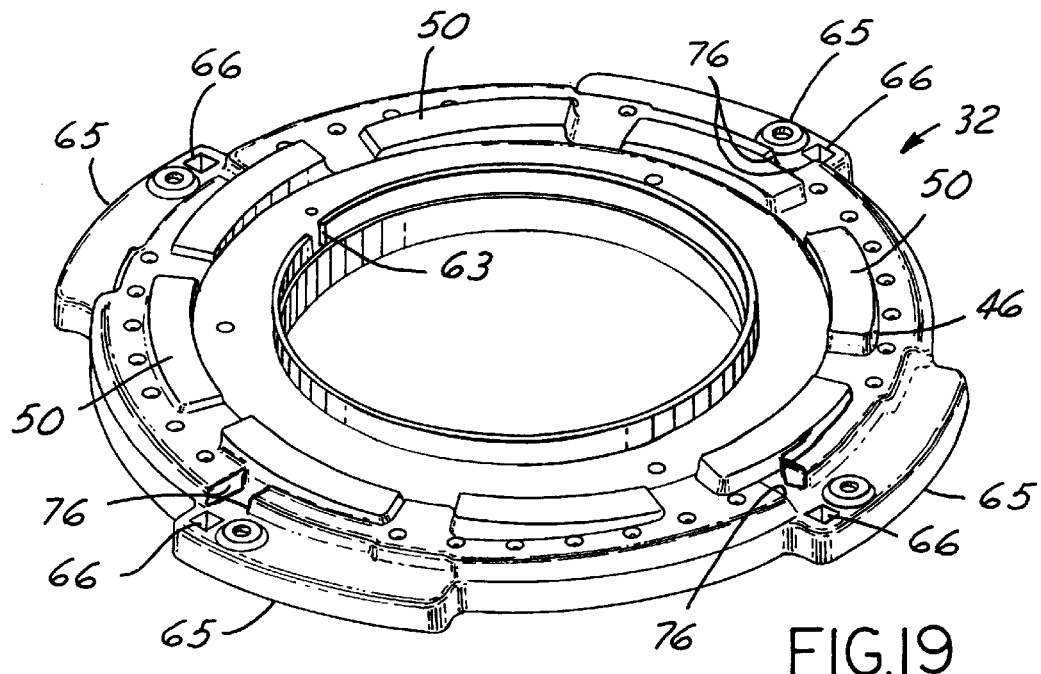
FIG. 19 is a perspective view of a clutch pressure plate.

Adjustment mechanism 40 includes a first or stationary annular cam 46 disposed within a cam groove 48 in pressure plate 32. Stationary annular cam 46 is concentric with axis 22. Cam 46 has a plurality of first ramped cam surfaces 50 on a side opposite cam groove 48. Alternatively, stationary annular cam 46 and first ramped cam surfaces 50 are formed integral with pressure plate 32 such that cam surfaces 50 are formed as a singular unit with pressure plate 32 as shown in FIGS. 12 and 19. The stationary annular cam 46 of FIG. 2 is prevented from rotating by a plurality of anti-rotation pins 52 extending from a bottom surface of groove 48 into receiving apertures of cam 46. A second or rotating annular cam 54 is disposed over stationary annular cam 46, and has a plurality of second ramped cam surfaces 56 in engagement with first cam surfaces 50 as best seen in FIGS. 3 and 6. Second pivot ring 44 is disposed in a groove in rotating annular cam 54 on a side opposite cam surfaces 56. An effective pressure plate thickness H from engagement surface 30 to a top of cam 54 is controlled by adjustment mechanism 40 as shown in FIGS. 3 and 6. Alternatively, rotating annular cam 54 can be formed with a peak defining a constant diameter circle on the side of cam 54 opposite cam surfaces 56 for engagement with diaphragm spring 38 as shown in FIG. 12. The provision of the peak eliminates the need for second pivot ring 44.

Figure 14:
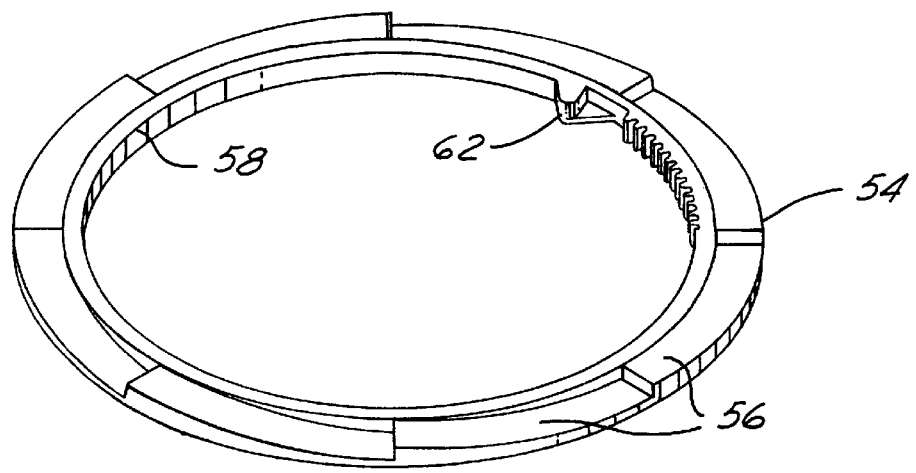
FIG. 14 is a perspective view of a first side of a rotating cam member.
Figure 15:
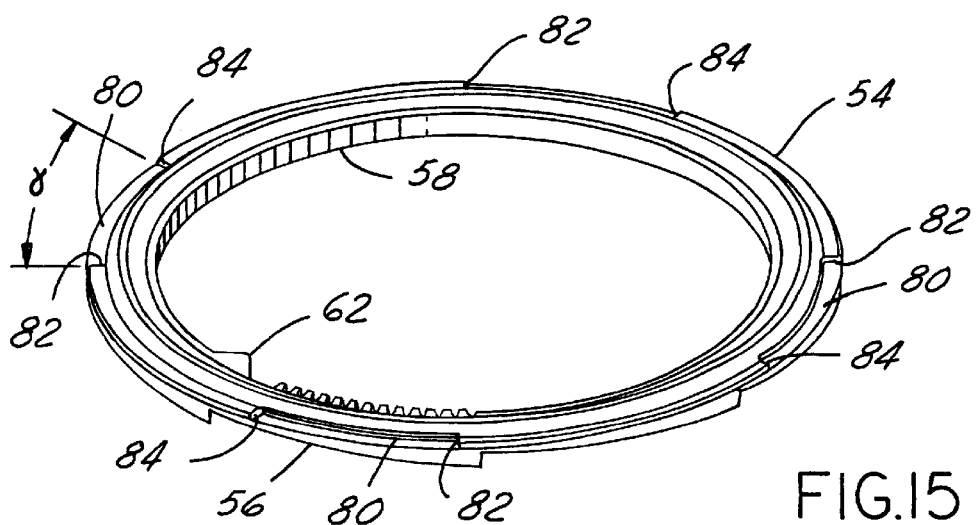
FIG. 15 is a perspective view of the second side of the rotating cam member of FIG. 14.

A plurality of cam alignment pins 57 are disposed radially within rotating annular cam 54 for engagement therewith to maintain cam 54 in concentric alignment with axis 22. Alternatively, cam 54 can be provided with a pilot shoulder 58 as shown in FIGS. 12 and 14 which maintains cam 54 concentric with respect to pressure plate 30.

Figure 8:
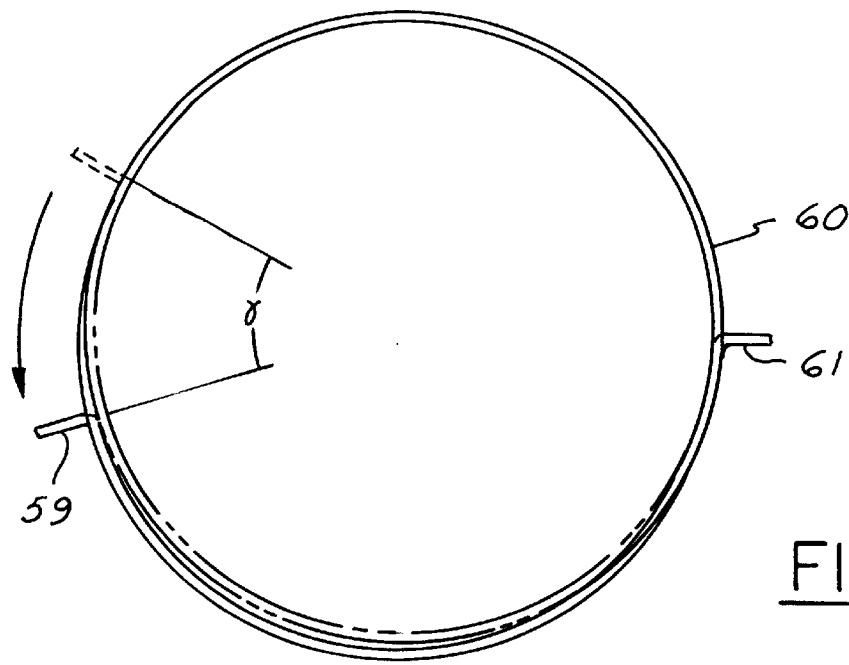
FIG. 8 is an end view of the cam spring in worn and unworn positions.
Figure 7:
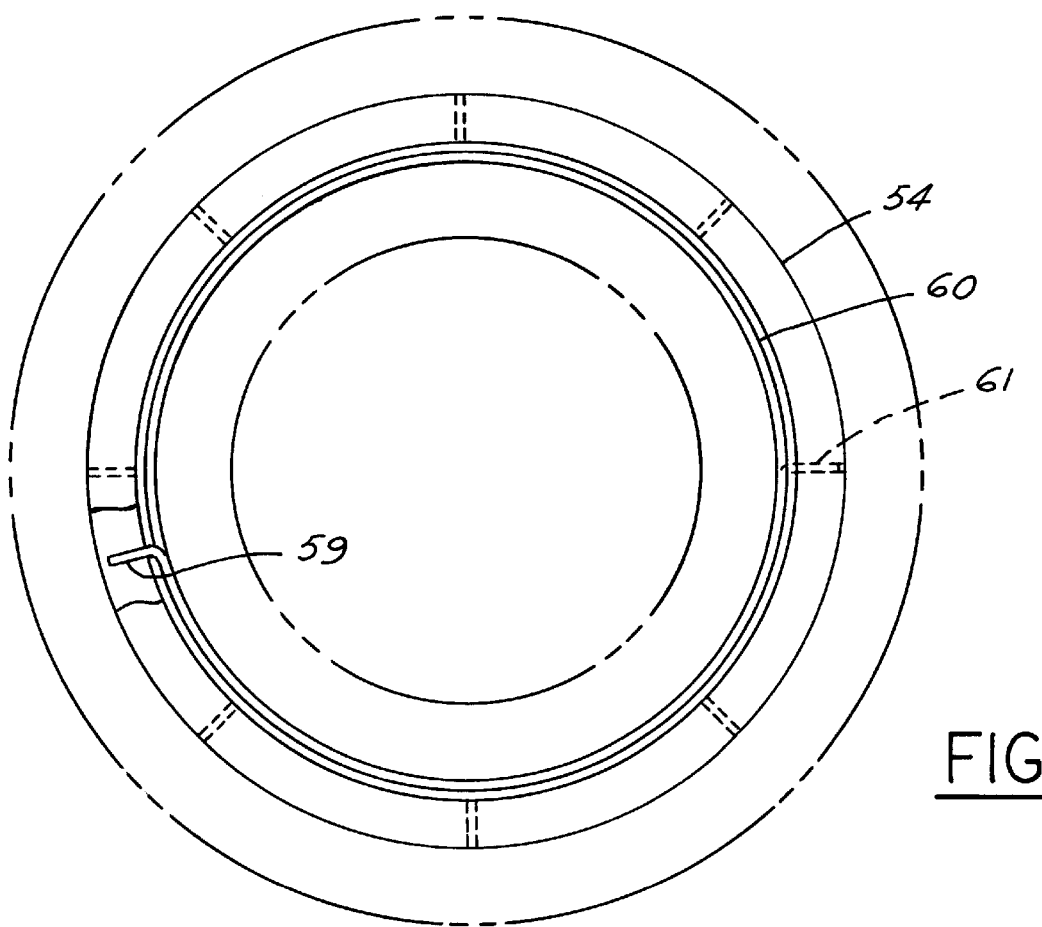
FIG. 7 is an end view of the cam spring and the annular cams showing engagement of the cam spring therewith.
Figure 16:
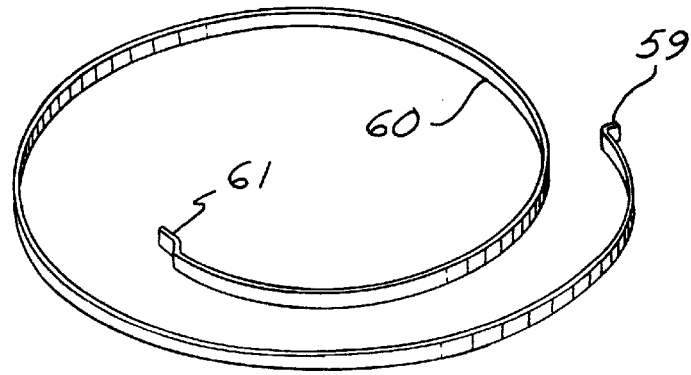
FIG. 16 is a perspective view of a cam spring in a free position.
Figure 17:
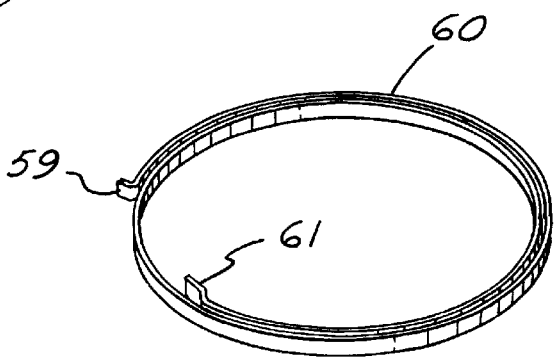
FIG. 17 is a perspective view of the cam spring of FIG. 16 in a worn clutch position.
Figure 18:
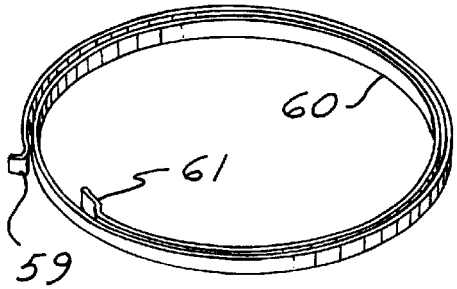
FIG. 18 is a perspective view of the cam spring of FIG. 16 in a new clutch position.

A cam spring 60 formed of round wire, best shown in FIGS. 7 and 8, is disposed between stationary annular cam 46 and rotating annular cam 54, biasing the cams in the direction tending to increase effective pressure plate thickness 11 from engagement surface 30 to second pivot ring 44 as shown in FIG. 6. Cam spring 60 is shown in a "new" clutch position in phantom lines and in a "worn" clutch position in solid lines. Cam spring 60 has a first end 59 which is disposed in a hole in rotating annular cam 54 for movement therewith. A second end 61 of spring 60 is preferably received by a slot in either stationary annular cam 46 or pressure plate 32. Alternatively, as shown in FIGS. 16–18, cam spring 60 can be formed of flat wire like that used for clock springs. As shown in FIG. 22, first end 59 of flat wire spring 60 has an included angle α of approximately 74° that engages a spring hook 62 on rotating annular cam 54 having an included angle β of approximately 72°. Having angles of less than 90° significantly reduces any tendency of first end 59 to slip off hook 62. A triangular web portion extending between hook 62 and shoulder 58 axially traps first end 59 on one side of cam member 54 while pressure plate 32 traps it on the other. Second end 61 of spring 60 is disposed in a notch 63 in a ring portion of pressure plate 32, best shown in FIG. 19. FIGS. 16, 17 and 18 show flat wire spring 60 in a free position, a worn clutch position and a new clutch or fully wound position respectively. As driven disc 26 wears, spring 60 unwinds, biasing cam 54 to a position of increased thickness H.

A mechanism for limiting adjustment of adjustment mechanism 40 includes a plurality of pressure plate extensions 65, best shown in FIG. 9 and FIG. 19, which extend radially from an outer diameter of pressure plate 32. Extensions 65 each have an aperture 66 slidably retaining a cam control finger 64 for axial movement therein parallel to axis 22. Fingers 64, a first embodiment of which is best shown in FIG. 10, are substantially square in cross section along their entire length. Fingers 64 have an axially extending shank portion 68 disposed in apertures 66, and an arm portion 70 extending radially inwardly to engage rotating annular cam 54. Arm portion 70 extends at an angle, as shown in FIGS. 2–5, from shank portion 68 to a tip portion 73. Tip portion 73 is of reduced thickness compared to arm portion 70 and shank portion 68. Shank portions 68 each have a drag spring 72 disposed in a finger spring pocket 74 in a lateral side of shank portion 68. Drag springs 72 are leaf springs which bow outward from pockets 74 to produce a drag or retention load within aperture 66 resisting axial movement therein. Leaf springs advantageously present a significant amount of surface area for even distribution of the spring load against the facing wall of aperture 66 and also introduce a minimal number of additional parts. The drag spring 72 preload and spring rate are selected to induce sufficient axial resistance to finger movement to prevent movement of fingers 64 due to axial loading induced by cam spring 60, while slipping responsive to the force of diaphragm spring 38 forcing pressure plate 32 against driven disc 26. A first end of cam control fingers 64 contacts engagement surface 34 of flywheel 24 when clutch 20 is engaged. Fingers 64 are forced to slide in apertures 66 when the ends of shank portions 68 come into contact with engagement surface 34 and the pressure plate diaphragm spring 38 or an equivalent biasing member forces pressure plate 32 against driven disc 26. An alternative embodiment of fingers 64 and drag springs 72 is shown in FIG. 20 and FIG. 12 with drag spring 72 being disposed on a radially inner side of shank portion 68. Yet alternatively, drag springs 72 could be disposed on more than one side of shank portion 68. The alternative finger 64 of FIGS. 12 and 20 has its arm portion 70 bent, first extending parallel to pressure plate 32 from shank portion 68 and then angling up to tip portion 73.

Determining the optimal combination or balance of spring rates and preloads for leaf spring 39, cam spring 60 and finger pre-load springs 72 may require some experimentation for a particular clutch. As noted above, the drag springs 72 must enable fingers 64 to resist the biasing force of cam spring 60 and give way to the force exerted by diaphragm spring 38. This balance is relatively easy to achieve because of the large difference in force between that attributable to cam spring 60 and diaphragm spring 38. Also, cam spring 60 should not be so strong that it, by itself, could overcome the resistance to rotation of rotating cam 54 imposed by leaf spring 39, thus rendering the fingers 64 ineffective in limiting adjustment of cam 54.

Cam control fingers 64 are prevented from rotating relative to pressure plate 32, not only by the substantially square shape of the shank portion and the apertures, but also by a pair of opposed anti-pivot shoulders or positioning lugs 76 disposed on opposite sides of arm portion 70. While a rectangular shape, and in particular a substantially square shape is preferred for the cross section of fingers 64, other cross sectional shapes may alternatively be employed, especially when positioning lugs 76 are provided, as the shape of the cross section is made less critical in the prevention of the rotation of fingers 64 by lugs 76. It should be appreciated that the bent arm portion 70 shown in FIG. 12 and FIG. 20 advantageously enables the use of lower profile lugs 76.

Tip portion 73 engages an engagement step 80 formed at an outside diameter arc portion of rotating annular cam 54. Both step 80 and tip portion 73 with its reduced thickness contribute to providing a low profile cam travel limit which avoids interference with the operation of diaphragm spring 38. A first end 82 and a second end 84 of engagement step 80 define rotary stops separated by an included angle γ of approximately 34°. The included angle γ is approximately equal to the amount of rotation that cam 54 is expected to rotate which varies with the anticipated wear driven disc 26 and the slope of cam surfaces 50 and 56. Of course, alternative structures could provide this rotation limiting function. For example, step 80 could completely circumscribe cam 54, with rotation being limited by engagement between a radially extending feature of cam 54 and an axially extending projection from pressure plate 32.

FIG. 21 shows a section of clutch 20 with a reset mechanism 86. Reset mechanism 86 includes a reset driver or driving tool 88 selectively slidably disposed over pilot pin 90. Driver 88 has a pilot bore 92 enabling driving tool 88 to rotate about pilot axis 94 of pilot pin 90. A driver head 96 of driving tool 88 has five driver teeth 98 which drivingly engage cam teeth 100 of rotating annular cam 54. Of course there could be a different number of teeth 98 on head 96. Hex flats 102 define a driving feature of driving tool 88 on an end opposite driver head 96, and enable engagement of driving tool 88 by a conventional wrench. Diaphragm spring fingers 37 terminate in arcuate shaped openings 10 with one of openings 110 being aligned with a cover notch 106 on the inside diameter of cover 36, both of which are in alignment with pilot pin 90. The alignment of diaphragm spring opening 104, cover notch 106 and pilot pin 90 enable driving tool 88 to be selectively slipped over pilot pin 90 for driving engagement of driver teeth 98 with cam teeth 100, and for driving tool 88 to be selectively removed from clutch 20.

A finger access opening 105 is aligned with each of cam control fingers 64 in alignment with shank portions 68. Opening 105 is sufficient large to enable a pin or a punch to be engaged against fingers 64 for the purpose of returning them to a new or unworn position after rotating annular cam 54 has been returned to a new or unworn position.

Figures 23, 24:
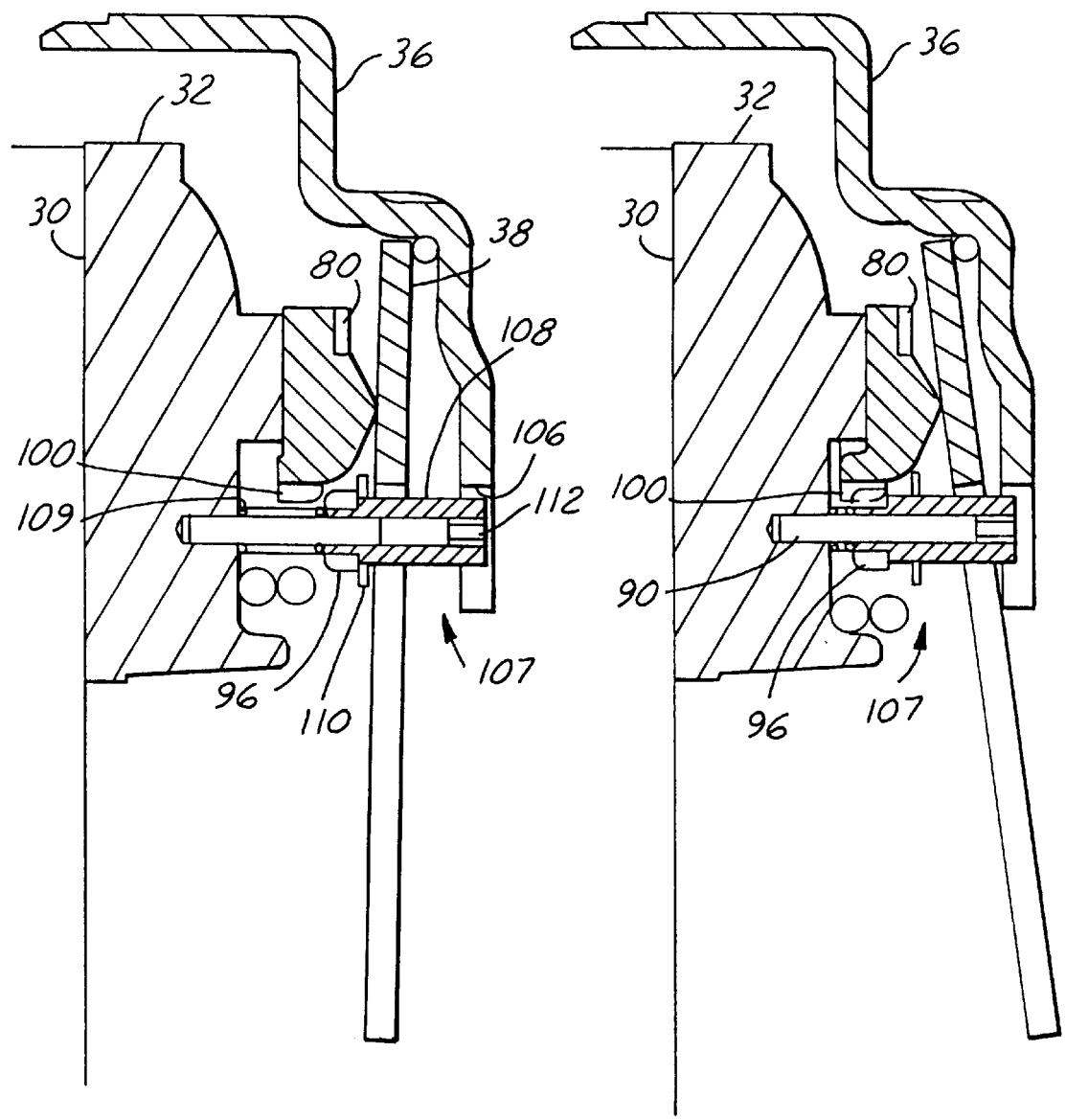
FIG. 23 is a sectional view of a clutch in an engaged position with a reset mechanism in a non-driving position.
FIG. 24 is a sectional view of the clutch of FIG. 23 in a disengaged position with the reset mechanism in a driving position.

FIGS. 23 and 24 show a reset mechanism 107 slightly different from that of reset mechanism 86. Reset mechanism 107 is substantially the same as reset mechanism 86, except that reset mechanism 107 includes a driving tool 108 which is not removed from clutch 20. Driving tool 108 is biased along pilot pin 90 to a disengaged or non-driving position by a coil type driver return spring 109. Retaining washer I 10, having an outside diameter larger than that of diaphragm spring opening 104 is disposed on driver 108 between driver head 96 and diaphragm spring 38. A shank portion of driver 108 has an internal hex or Allen type socket. As shown in FIG. 23, cam 54 is in a worn position. In FIG. 24, the same reset mechanism 107 is shown, but with the clutch assembly 20 in a released condition, and with cam 54 having been reset to a new or unworn position.

FIGS. 25–40 are all directed to yet other alternative reset mechanism embodiments.

Figure 25:
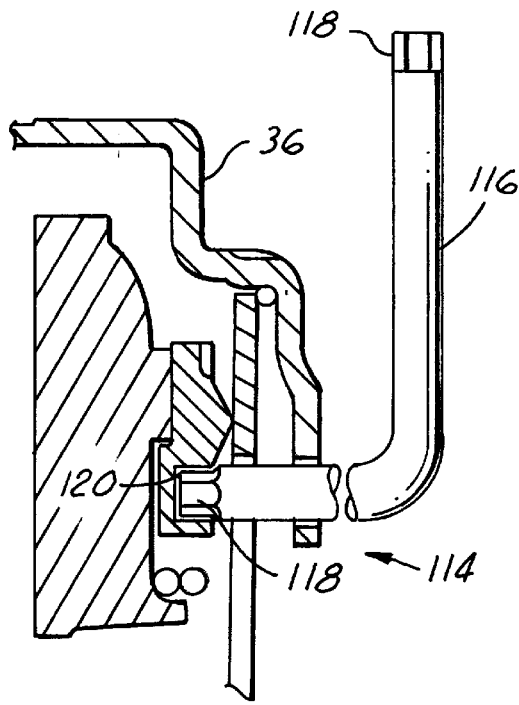
FIG. 25 is a sectional view of the clutch of FIG. 23 having an alternative reset mechanism.

The reset mechanism 114 of FIG. 25 includes an L-shaped driving tool 116 having star-shaped driver heads 118 on each end thereof. The star-shaped driver heads 118 have six points but could have more or fewer points. Cam 54 has a driving slot 120 which receives one of drivers 118 of driving tool 116. Slot 120 has a series of undulations on at least one side which cause cam 54 to be reset with rotation of driving tool 116.

Figure 26:
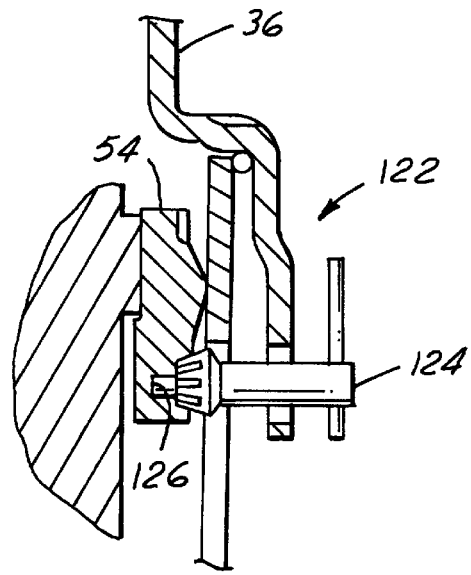
FIG. 26 is a sectional view of the clutch of FIG. 23 having an alternative reset mechanism.

The reset mechanism 122 shown in FIG. 26 is substantially the same as reset mechanism 114 of FIG. 25, except that a removable drill chuck key 124 is used as the driving tool. A slot 126 in cam 54 receives a tip of chuck key 124. Teeth of rotating cam 54, engaged by the teeth of chuck key 124, are disposed on cam 54 adjacent slot 126.

Figure 27:
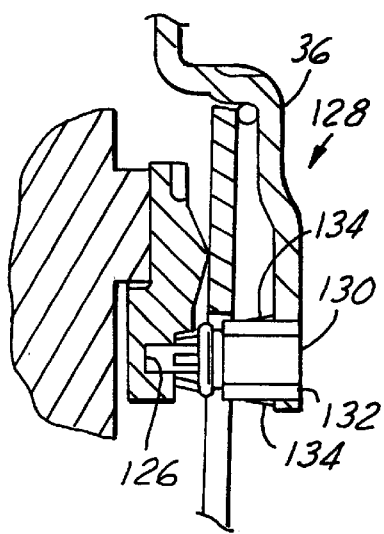
FIG. 27 is a sectional view of the clutch of FIG. 23 having an alternative reset mechanism.

Reset mechanism 128 of FIG. 27 is substantially similar to reset mechanism 122 except that driving tool 130 of mechanism 128 remains constantly engaged with cam 54. Driving tool 130 has a tip disposed in a slot 126. Tool 130 is retained by a plastic bushing 132 slidably disposed over a shank of driving tool 130, and having locking tabs 134 extending from bushing 132 preventing removal of bushing 132 and driving tool 130 from clutch cover 36. Driving tool 130 has an Allen head drive socket (not shown).

Figure 28:
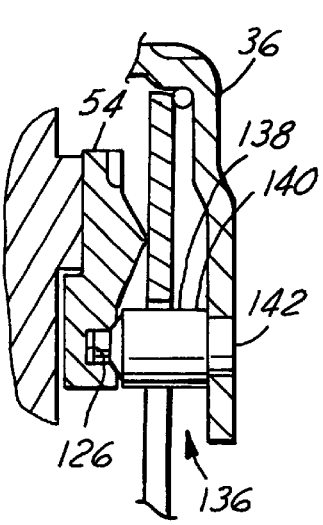
FIG. 28 is a sectional view of the clutch of FIG. 23 having an alternative reset mechanism.

The reset mechanism 136 of FIG. 28 is substantially the same as reset mechanism 128, except that driving tool 138 is provided with a large diameter shank 140 and a small diameter end 142 with driving tool 138 being trapped between cover 36 and cam 54.

Figure 29:
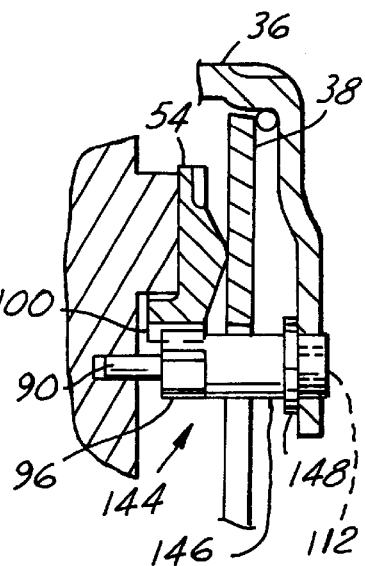
FIG. 29 is a sectional view of the clutch of FIG. 23 having an alternative reset mechanism.

The reset mechanism 144 of FIG. 29 is substantially the same as reset mechanism 107 of FIGS. 23 and 24. Driving tool 146 is retained within clutch 20 by an oversized flange 148 between cover 36 and diaphragm spring 38. Also, driver head 96 remains in constant engagement with cam teeth 100.

Figure 30:
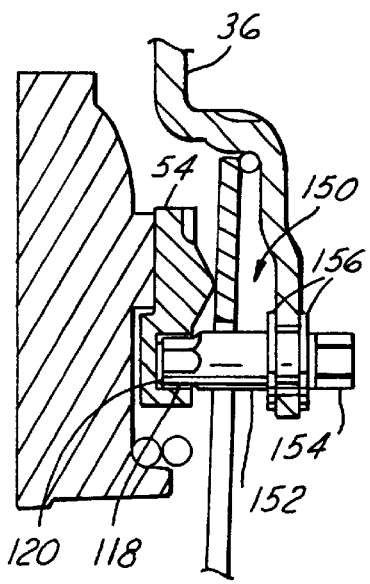
FIG. 30 is a sectional view of the clutch of FIG. 23 having an alternative reset mechanism.

The reset mechanism 150 of FIG. 30 is substantially similar to reset mechanism 114 except that the driving tool 152 of reset mechanism 150 remains with clutch 20. While driving tool 152 is shown with the same driving head 118 as used in reset mechanism 114, it does not have an L-shaped handle but instead has a hex head driving feature for engagement by a box wrench, an open end wrench or a rachet. Driving tool 152 is retained in clutch 20 by a pair of snap rings 156, one placed on either side of cover 36 as shown in FIG. 30. Alternatively, push lock rings may be used in place of snap rings 156.

Figure 31:
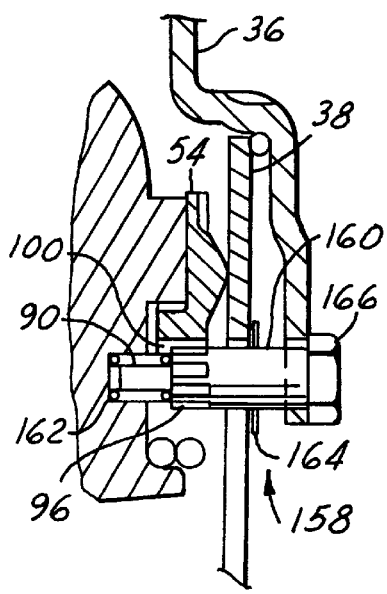
FIG. 31 is a sectional view of the clutch of FIG. 23 having an alternative reset mechanism.

The reset mechanism 158 of FIG. 31 has a driving tool 160 biased to a disengaged or non-drive position by biasing spring 162. A snap ring 164 engaging driving tool 160 and oversized hex head 166 axially retain driving tool 160 within clutch 20. A force directed against hex head 166 in the direction of spring 162 forces driving tool 160 into engagement with cam teeth 100. Disengagement of driver head 96 from cam teeth 100 eliminates fretting corrosion between the gear teeth which would otherwise result from engagement between the parts when the engine is operating.

Figure 32:
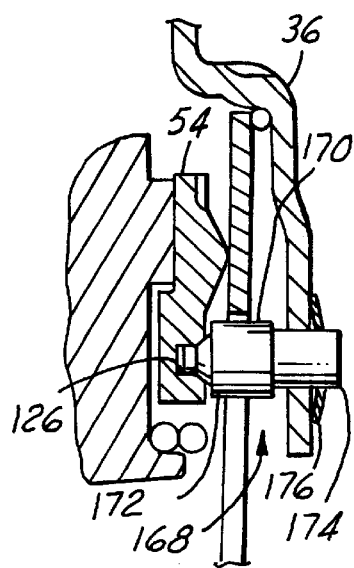
FIG. 32 is a sectional view of the clutch of FIG. 23 having an alternative reset mechanism.

The reset mechanism 168 of FIG. 32 is substantially similar to reset mechanism 138 of FIG. 28. A driving tool 170 has a tip disposed in slot 126. Teeth of driving tool 170 are in engagement with teeth of cam 54. Driving tool 170 has a large diameter shank portion 172 and a small diameter shank portion 174 opposite large diameter shank portion 172 from the tip of driving tool 170. A push-on belville spring 176 is disposed over small diameter shank portion 174 outside cover 36 to bias driving tool 170 to a disengaged position. FIG. 32 shows driving tool 170 in an engaged position as if it were being pressed towards cam 54 overcoming the spring load of belville spring 176. As with reset mechanism 158 of FIG. 1., driving tool 170 is biased out of an engagement position when clutch 20 is in operation, thereby eliminating fretting corrosion.

Figure 33:
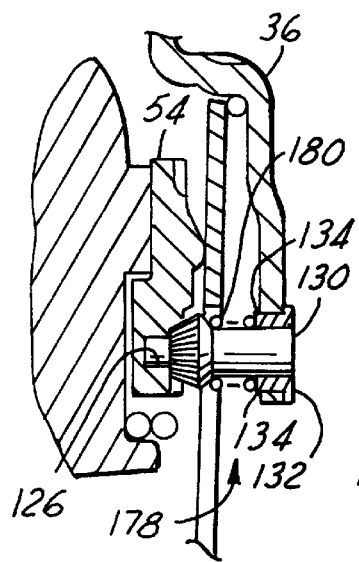
FIG. 33 is a sectional view of the clutch of FIG. 23 having an alternative reset mechanism.

The reset mechanism 178 of FIG. 33 is substantially the same as reset mechanism 128 of FIG. 27. Plastic bushing 132 of reset mechanism 178 is slightly shorter, enabling biasing spring 180 to be disposed between bushing 132 and the head of driving tool 160 which bears the engagement teeth. Spring 180 biases driving tool 130 to an engaged position so that it remains engaged with the teeth of cam 54 even when clutch 20 is being operated. Biasing driving tool 130 in this direction introduces additional friction in the system which damps the cam movement caused by torsional pulses from the vehicle drive train. The spring load also reduces the amount of fretting corrosion between the gear teeth when compared with the unbiased system of FIG. 27.

Figure 34:
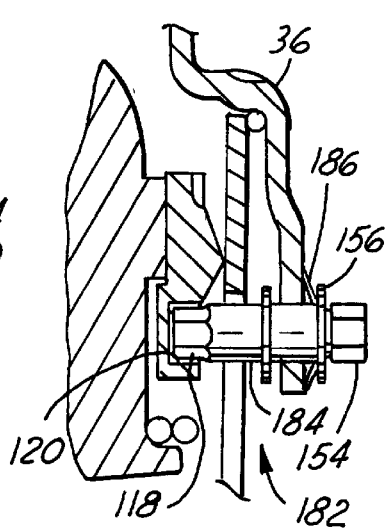
FIG. 34 is a sectional view of the clutch of FIG. 23 having an alternative reset mechanism.

Reset mechanism 182 as shown in FIG. 34 is substantially similar to reset mechanism 150 of FIG. 30. However, a driving tool 184 of reset mechanism 182 has slots for snap rings 156 spaced slightly further apart then does driven 152. Additionally, a belville spring 186 disposed between cover 36 and the outermost of snap rings 156 biases driving tool 184 to a disengaged position, even through driving tool 184 is shown in an engaged position in FIG. 34. As noted in the discussion of reset mechanism 158 and 168, when driving tool 184 is disengaged from cam 54 and its teeth, fretting corrosion is eliminated.

Figure 35:
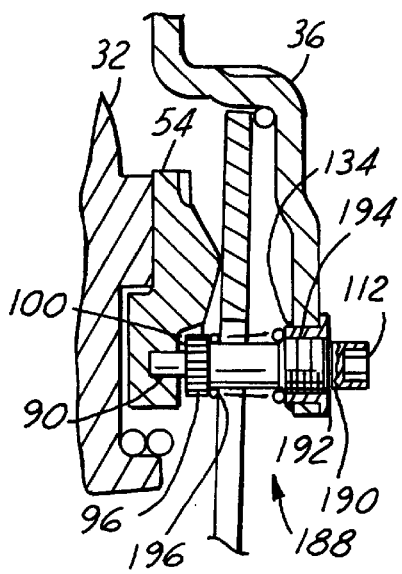
FIG. 35 is a sectional view of the clutch of FIG. 23 having an alternative reset mechanism.

The reset mechanism 188 of FIG. 35 is somewhat similar to reset mechanism 144 in that driving tool 190 pilots on pin 90. Driver head 96 remains engaged with cam teeth 100. A threaded bushing 192 is fixed in cover 36. A threaded shank portion 194 of driving tool 190 is threadably engaged with and disposed within bushing 192. A biasing spring 190 is disposed between driver head 96 and threaded bushing 192. The spring biasing load, as noted earlier, helps damp torsional impulses which tend to cause the cam 54 to adjust. It should be appreciated that the exposed end of driving tool 190 extending beyond cover 36 can be used as an indicator of clutch wear, as the amount of driving tool 190 extending beyond cover 36 will vary with the amount of wear. For example, reset mechanism 188 could be configured so that when the clutch is worn, the end of driving tool 190 in which the allen head driving feature 112 is disposed will be flush with an outer surface of bushing 192 when the clutch is worn.

The reset mechanism 198 shown in FIGS. 36 and 37 employs a driving tool 200 having a toothed drum 202 affixed thereto. Toothed drum 202 driveably engages cam teeth 204. Driving tool 200 is maintained in its operating position by having a first end piloting in an aperture 205 in pressure plate 32 and having a second end piloting in an aperture in bushing 206 which is in turn disposed in cover 36. Driving tool 200 has a handle/indicator portion 208 which extends at 90° to axis 94 on which driving tool 200 is piloted. Toothed drum 202 drives rotating annular cam 210, which is disposed between pressure plate 32 and a non-rotating but axially displaceable annular cam 212. A retaining member 214 is fixed to non-rotating annual cam 212 and slidably engages pressure plate 32. As driven disc 26 wears, handle/indicator portion 208 pivots from the "New" position, shown in solid lines in FIG. 37, to the "Replace" position, shown in phantom lines in FIG. 37. It should be appreciated that precise dimensions of these parts, and the angle shown in FIG. 37 will vary depending upon the specific application.

The reset mechanism 216 of FIG. 38 is shown only in part. A rotating cam ring 218 moves with respect to the associated non-rotating cam ring and pressure plate (note shown). Rotational travel of cam ring 218 occurs when driven disc 26 wears. A screw driver 220 or other prying tool is used to pry ring 218 as required to reset the clutch. Screwdriver 220 engages notches 222 in cam ring 218. Rotation of cam ring 218 is limited by pins 224 which are fixed to a non-rotating part of the clutch, such as the pressure plate.

Figure 39:
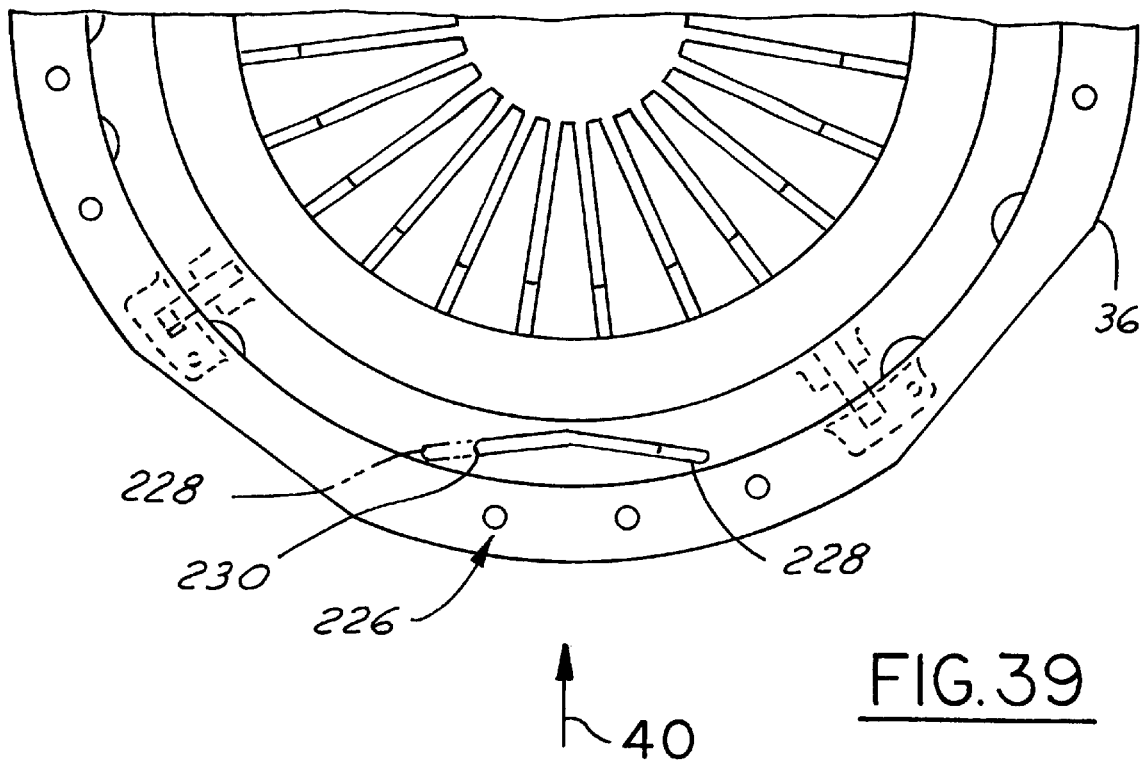
FIG. 39 is a partial end view of a clutch having an alternative reset mechanism.
Figure 40:
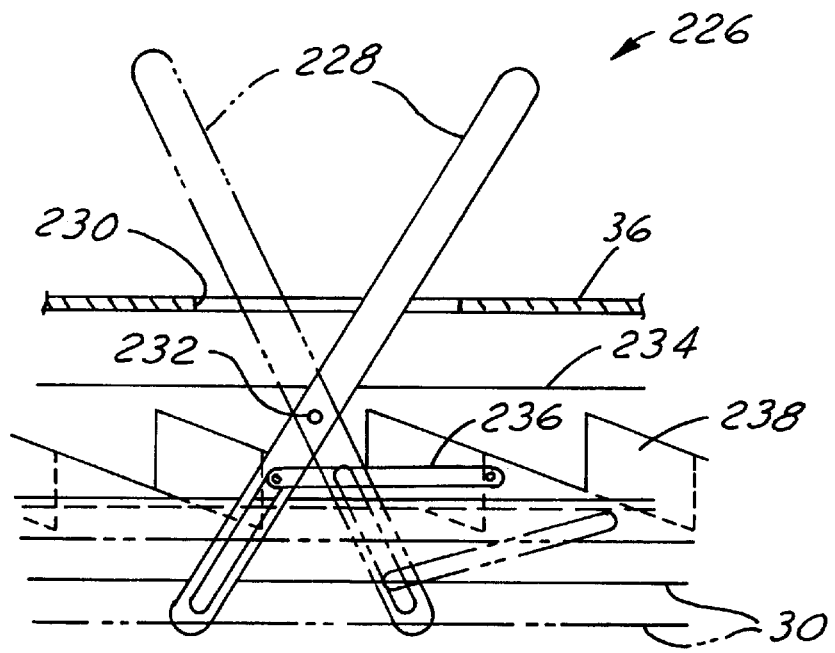
FIG. 40 is a broken-out sectional view of the clutch of FIG. 39 in the direction of arrow 40.

Reset mechanism 226 of FIGS. 39 and 40 includes a return lever 228 which toggles within a lever slot 230 in cover 36 between a new or unworn position shown in solid lines and a used or worn position shown in phantom lines. Lever 228 pivots about lever pivot 232 on fixed cam 234. A link member 236 extends from rotating cam 238 to a lower slot in lever 228.

The invention operates in the following manner. In a new or no-wear condition, as shown in FIGS. 2 and 3, cam control fingers 64 are at their original position relative to pressure plate 32. With clutch assembly 20 engaged, the first ends of cam control fingers 64 are in contact with flywheel engagement surface 34. The effective thickness H of pressure plate 32 is at its minimum when the thickness of driven disc 26 is at its maximum. The contact surface of tip portion 73 is in contact with the surface of engagement step 80. The load applied in the engaged condition by diaphragm spring 38 against adjustment mechanism 40 maintains the relative rotative position of cams 46 and 54. Cam control fingers 64 do not come into contact with cover 36 at any time during the travel of pressure plate 32 when the clutch is released as shown in FIG. 3. As clutch assembly 20 is released by displacing diaphragm spring 38 as shown in FIG. 3, leaf spring anti-rotation strap 39 biases pressure plate 32 away from flywheel 24 and toward cover 36. When the clutch is fully released, the axial force of rotating cam 54 against diaphragm spring 38 drops to equal the force attributable to leaf spring 39 biasing pressure plate 32 toward cover 36. Cam control fingers 64 move axially with pressure plate 32 as a unit, thereby preventing rotation of rotating annular cam 54.

FIG. 4 shows clutch 20 in an engaged position after it has experienced some wear of friction element 28, but without any adjustment of effective thickness H by adjustment mechanism 40. Because of the continuous adjusting characteristic of adjustment mechanism 40, the size of a gap D between the surface of tip portion 73 and engagement step 80 is always very small when there is one, as it would in most cases be limited to the amount of wear attributable to a single clutch re-engagement. The size of gap D has been exaggerated in FIG. 4 for this illustration.

When the clutch pedal (not shown) is depressed, a release bearing (not shown) axially displaces the tips of diaphragm spring 38's finger portions proximate to axis 22 away from flywheel 24 to unload pressure plate 32. Clutch 20, when disengaged or released, continuously adjusts the rotative position of rotating annular cam 54 relative to stationary annular cam 46 by using the torsional vibrations induced by the firing pulses of the engine. The torsional vibrations are alternatively identified as torsional firing pulses. The firing pulses help cam spring 60 overcome the resistance to adjustment imposed by leaf spring 39 which biases rotating cam 54 against diaphragm spring 38. The desired adjustability is made possible by selecting diaphragm spring, leaf spring 39 and cam spring 60 having spring characteristics which enable the torsional firing pulses to induce rotation of rotating cam 54 relative to stationary cam 46 when clutch 20 is in a released condition and leaf spring 39 biases rotating cam 54 against spring 38. The resultant continuous adjustment for wear, or adjustment with each disengagement of the clutch assembly 20, represents an advantage over known automatic adjustors. Known automatic adjustors typically adjust only when the diaphragm spring is deflected sufficiently far to separate the diaphragm spring from the adjustor. Mechanisms requiring such full disengagement may require a conscious effort by the vehicle operator to extend the clutch pedal to a full travel position to obtain the desired adjustment, making the adjustment less than fully automatic.

A first departure gap E, shown in FIG. 5, is present between flywheel engagement 25 surface 34 and the first end of finger 64. A second departure gap F between pressure plate engagement surface 30 and driven disc 26. Departure gap E exceeds departure gap F by the amount, if any, that driven disc 26 deflects when it is unloaded. The amount of deflection will, of course, be greater if driven disc 26 is a cushioned driven disc. FIG. 5 reflects the adjustment of the rotating annular cam 54 that occurs with the engine firing pulses. Annular cam 54 appears to have increased in sectional thickness because of its rotation relative to the sectional plane. The axial position of finger 64 in pressure plate extensions 65 relative to pressure plate engagement surface 30 does not change while the clutch remains disengaged. But, when the clutch pedal is released and pressure plate 32 reengages driven disc 26, the resultant small amount of wear of friction element 28 will cause finger 64 to shift relative to pressure plate engagement surface 30. When the clutch is later released, cam 54 will adjust to the amount permitted by fingers 64, thereby increasing thickness H an amount equal to the wear of friction element 28. It is such small incremental shifts in the position of fingers 64, in combination with the responsiveness of rotating annular cam 54 to engine firing pulses, which enables the advantageous continuous adjustment characteristic of the present invention.

The reset mechanism 86 of FIG. 21 is used after it has been determined that driven disc 26 has reached the end of its useful life and clutch assembly 20 is removed from the motor vehicle to enable replacement of driven disc 26. Clutch 20 is mounted to a loading fixture and diaphragm spring 38 is subsequently deflected to relieve pressure plate 32 and adjustment mechanism 40 of the associated load. When adjustment mechanism 40 is unloaded, driving tool 88 of reset mechanism 86 is passed through diaphragm spring opening 104 and cover notch 106 and slipped over pilot pin 90. Driver teeth 98 of driver head 96 mesh with cam teeth 100. Reset driving tool 88 is engaged by a ratchet wrench or the like, and rotated to return rotating annular cam 54 back to its new or unworn position. Sufficient torque must be exerted on driving tool 88 to overcome cam spring 60. Before the torque is released from driving tool 88, the relative rotative position of rotating annular cam 54 must be set relative to stationary annular cam 46. This can be accomplished by releasing the diaphragm spring to re-engage adjustment mechanism 40 or by resetting one or more of fingers 64.

Resetting the position of rotating annular cam 54 has no effect on the axial positions of fingers 64. After resetting the rotative position of rotating annular cam 54, there will be a gap between tip portion 73 of fingers 64 and engagement step 80. Fingers 64 are reset individually by passing a pin or punch through finger access opening 105 to contact finger 64. Lightly tapping the pin or punch displaces finger 64 in the direction of force and restores contact between tip portion 73 and engagement step 80. The preferred embodiment, as disclosed herein, has four fingers 64. Each of the four fingers may be reset while the clutch is mounted to the loading fixture. However, resetting only one pin is sufficient to adequately restrain rotating annular cam 54 from excessive rotation prior to its installation in a vehicle. Preferably, only one finger is reset on the resetting fixture with the other three fingers being reset after the clutch, in combination with a new driven disc, is installed in a vehicle.

FIGS. 23 and 24 illustrate the use of an alternative reset mechanism 107. Reset mechanism 107 is substantially the same as reset mechanism 86, except that alternative driving tool 108 is permanently installed in clutch 20. Driving tool 108 is spring loaded so that, when no in use as shown in FIG. 23, its teeth 98 are not engaged with cam teeth 100. Retaining washer 110 limited the axial travel of driving tool 108 due to spring 109. As shown in FIG. 24, adjustment occurs when the clutch is in a released condition. Driving tool 108 is simultaneously pressed downward toward pressure plate 32 while being rotated to reset the position of rotating annular cam 54. The change in profile from FIG. 23 to FIG. 24 of rotating annular cam 54 reflects the resetting of cam 54 from a worn position to a new position. Certain details of the clutch have been eliminated from FIGS. 23 and 24, such as fingers 64, to eliminate potentially confusing detail not directly relating to the alternative embodiment of the reset mechanism.

FIGS. 25 and 26 both illustrate alternative embodiments of reset mechanisms 114 and 122 which employ removable driving tools 116 and 125 respectively.

FIGS. 27, 28, 29 and 30 all show alternative embodiments of reset mechanisms 128, 136, 144 and 150 respectively in which the associated driving tools are permanently captured, but are not spring loaded. FIGS. 31, 32, 33 and 34 all show spring biased driving tools which are permanently captured within clutch 20. FIG. 35 shows yet another alternative embodiment of reset mechanism 188 in which an exposed end of driving tool 190 may be used as a wear indicator as described above.

The reset mechanism 198 of FIGS. 36 and 37 is shown in combination with rotating annular member 210 which is disposed between pressure plate 32 and non-rotating annular cam 212, unlike the other adjustment mechanisms discussed herein which had the rotating annular cam disposed opposite the stationary annular cam from the pressure plate. When the clutch of FIG. 36 is loaded into the reset fixture, and the diaphragm spring load is removed, handle/indicator position 208 is easily pivoted to the new position to reset the adjustment mechanism.

A very simple reset mechanism is shown in FIG. 38. Once the clutch has been unloaded in the reset fixture, rotating annular cam 218 is simply pushed back to its new or unused position by using a screwdriver to pry or push it back into place. When prying or pushing on rotating cam ring 218, a force sufficient to overcome cam spring 60 must be applied.

FIGS. 39 and 40 show yet another alternative embodiment for a reset mechanism. Reset mechanism 226 is disposed radially outboard of stationary annular 234 and rotating annular cam 238. As the clutch driven disc 26 wears, pressure plate engagement surface 30, moves lower and lower, as does rotating annular cam 238. Lever 228 moves from its new position, shown in solid lines, to the worn or used position shown in phantom lines. To reset the clutch adjustment mechanism for use with a new driven disc, lever 228 need merely be pivoted back to its new position when the load of diaphragm spring 38 is released.

It should be appreciated that there are readily apparent alternative embodiments to the above-described clutch components. For example, the pre-load spring 72 associated with each finger 64 could be retained within apertures 66 instead of on fingers 64. Also, springs 72 could be placed on more than one side of each finger 64. Further, rotating annular cam 54 and stationary annular cam 46 could be transposed so that stationary annular cam 46 is engaged by diaphragm spring 38. With regard to the reset mechanisms, any of the configurations for the driver head (five point, six point) could be used on driving tool having any of the disclosed driving features (hex head, Allen socket).

The embodiments disclosed herein have been discussed for the purpose of familiarizing the reader with the novel aspects of the invention. Although preferred embodiments of the invention have been shown and disclosed, many changes, modifications and substitutions may be made one having ordinary skill in the art without necessarily departing from the spirit and scope of the invention as described in the following claims.

We claim:

1. An adjustment mechanism for a frictional clutch for a motor vehicle comprising
   a pressure plate having an axis of rotation and an engagement surface substantially normal to the axis of rotation;
   a first annular cam member concentric with the axis of rotation and having a plurality of first ramped cam surfaces and being rotatively fixed with respect to the pressure plate;
   a second annular cam member rotatable relative to the first annular cam member and having a plurality of second ramped cam surfaces in engagement with the first ramped cam surfaces and together with the first annular cam member defining an effective pressure plate thickness relative to the engagement surface, and the second annular cam member also having an engagement step at an outer periphery thereof and the second annular cam member having a rotary travel limit feature at a predetermined location engaging a stop element in a first position, the stop element being rotatively fixed relative to the pressure plate;
   a cam spring disposed between the cam members and rotatively biasing the cam members toward an increased cam height;
   a cam control finger slidably disposed within an aperture in the pressure plate and having:
      a shank portion disposed in the aperture in the pressure plate and axially oriented for axial slidable displacement relative to the pressure plate and having a flat side aligned with a corresponding flat side of the aperture, and the flat side of the shank portion defining a pocket therein, and
      an engaging portion radially extending from the shank portion in engagement with the second annular cam member;
   an anti-rotation feature engaging the finger and comprising part of the pressure plate and preventing rotation of the finger relative to the pressure plate, the anti-rotation feature defined at least in part by the flat side of the aperture and the flat side of the shank portion; and
   a control finger drag spring biasing the finger into engagement with a side of the aperture and disposed between the finger and the pressure plate with the drag spring being substantially disposed within the aperture wherein the drag spring induces a frictional drag force resisting axial displacement of the control finger, the drag spring being a leaf spring disposed in the pocket of the shank portion.

2. An adjustment mechanism for a frictional clutch as claimed in claim 1 wherein the anti-rotation feature is defined at least in part by providing the aperture in the pressure plate with a substantially rectangular shape and providing at least a lower part of the shank portion with a cross sectional shape which is similarly rectangular so as to be received by the aperture.

3. An adjustment mechanism for a frictional clutch for a motor vehicle comprising:
   a pressure plate having an axis of rotation and an engagement surface substantially normal to the axis of rotation;
   a first annular cam member concentric with the axis of rotation and having a plurality of first ramped cam surfaces and being rotatively fixed with respect to the pressure plate;
   a second annular cam member rotatable relative to the first annular cam member and having a plurality of second ramped cam surfaces in engagement with the first ramped cam surfaces and together with the first annular cam member defining an effective pressure plate thickness relative to the engagement surface, and the second annular cam member also having an engagement step at an outer periphery thereof, the engagement step having a first end and a second end defining a rotary travel limit feature of the second annular cam member and, at a predetermined location, engaging a stop element in a first position, the stop element being rotatively fixed relative to the pressure plate;
   a cam spring disposed between the cam members and rotatively biasing the cam members toward an increased cam height;
   a cam control finger slidably disposed within an aperture in the pressure plate and having:
      a shank portion disposed in the aperture in the pressure plate and axially oriented for axial slidable displacement relative to the pressure plate, and
      an engaging portion radially extending from the shank portion in engagement with the second annular cam member, the engaging portion defining the stop element which is engaged by one of the first and second ends of the engagement step in the first position;
   an anti-rotation feature engaging the finger and comprising part of the pressure plate and preventing rotation of the finger relative to the pressure plate; and
   a control finger drag spring biasing the finger into engagement with a side of the aperture and disposed between the finger and the pressure plate with the drag spring being substantially disposed within the aperture wherein the drag spring induces a frictional drag force resisting axial displacement of the control finger.

4. A frictional clutch for a motor vehicle comprising:
   a cover;
   a pressure plate coupled to the cover for rotation therewith about an axis and having a frictional engagement surface substantially normal to the axis;
   a first biasing member interposed between the cover and the pressure plate selectively movable between engaged and disengaged positions and in the engaged position biasing the pressure plate to an engaged pressure plate position;
   a second biasing member rotatably coupling the pressure plate with the cover and biasing the pressure plate toward the cover;
   a first annular cam member centered about the axis and rotatably fixed relative to the pressure plate and having a plurality of first ramped cam surfaces;
   a second annular cam member centered about the axis and rotatable relative to the first annular cam member and having a plurality of second ramped cam surfaces engaging the first ramped cam surfaces and the first and second annular cam members being axially disposed between the pressure plate and the first biasing member, wherein the first and second annular cam members define an effective thickness of the pressure plate from the frictional engagement surface to an engagement feature of the second annular cam member, the effective thickness increasing with relative rotation in a first direction, and the second annular cam member also having an engagement step at an outer periphery thereof and the second annular cam member having a rotary travel limit feature at a predetermined location engaging a stop element in a first position, the stop element being rotatively fixed to the pressure plate;

a cam spring disposed between the cam members inducing relative rotation therebetween in the first direction;

a cam control finger slidably disposed within an aperture in the pressure plate and having
    a shank portion disposed in the aperture in the pressure plate and axially oriented for axial slidable displacement relative to the pressure plate, and
    an engaging portion radially extending from the shank portion in engagement with the second annular cam member;

an anti-rotation feature engaging the finger and comprising part of the pressure plate and preventing rotation of the finger relative to the pressure plate; and a control finger drag spring disposed substantially within the aperture and biasing the finger into engagement with a side of the aperture wherein the drag spring induces a frictional drag force resisting axial displacement of the control finger.

5. A frictional clutch for a motor vehicle as claimed in claim 4 wherein the shank portion has a flat side aligned with a corresponding flat side of the aperture, and the flat side of the shank portion defines a spring pocket therein and the control finger drag spring comprises a leaf spring and the leaf spring is disposed in the spring pocket.

6. A frictional clutch for a motor vehicle as claimed in claim 5, wherein the anti-rotation feature is defined at least in part by providing the aperture in the pressure plate with a substantially rectangular shape and providing at least a lower part of the shank portion with a cross sectional shape which is similarly rectangular so as to be received by the aperture.

7. A frictional clutch for a motor vehicle as claimed in claim 5 wherein the engagement step has a first end and a second end defining the rotary travel limit feature, one of the first and second ends being engaged by the stop element in the first position, the stop element being defined by the engaging portion of the cam control finger.

8. A frictional clutch for a motor vehicle comprising:

a cover;

a pressure plate coupled to the cover for rotation therewith about an axis and having a frictional engagement surface substantially normal to the axis;

a first biasing member interposed between the cover and the pressure plate selectively movable between engaged and disengaged positions and in the engaged position operably biasing the pressure plate to an engaged pressure plate position;

a second biasing member rotatably coupling the pressure plate with the cover and biasing the pressure plate toward the cover;

a first annular cam member centered about the axis and rotatably fixed relative to the pressure plate and having a plurality of first ramped cam surfaces;

a second annular cam member centered about the axis and rotatable relative to the first annular cam member and having a plurality of second ramped cam surfaces engaging the first ramped cam surfaces and the first a nd second annular cam members being axially disposed between the pressure plate and the first biasing member, wherein the first and second annular cam members define an effective thickness of the pressure plate from the frictional engagement surface to an engagement feature of the second annular cam member, the effective thickness increasing with relative rotation in a first direction, and the second annular cam member having a rotary travel limit feature at a predetermined location engaging a stop element in a first position, the stop element being rotatively fixed to the pressure plate;

a cam spring disposed between the cam members inducing relative rotation there between in the first direction;

a cam control finger slidably disposed within an aperture in the pressure plate and having
    a shank portion disposed in the aperture in the pressure plate and axially oriented for axial displacement relative to the pressure plate; and
    an engaging portion radially extending from the shank portion in engagement with the second annular cam member;

an anti-rotation feature engaging the finger and comprising part of the pressure plate and preventing rotation of the finger relative to the pressure plate; and a control finger drag spring disposed substantially within the aperture and biasing the finger into engagement with a side of the aperture wherein the drag spring induces a frictional drag force resisting axial displacement of the control finger and the drag force being sufficient to resist axial biasing forces attributable to one of the second biasing member and the cam spring but not sufficient to withstand a force attributable to the first biasing member.

9. A frictional clutch for a motor vehicle as claimed in claim 8 wherein the shank portion has a flat side aligned with a corresponding flat side of the aperture, and the flat side of the shank portion defines a spring pocket therein and the control finger drag spring comprises a leaf spring and the leaf spring is disposed in the spring pocket.

10. A frictional clutch for a motor vehicle as claimed in claim 9 wherein the anti-rotation feature is defined at least in part by providing the aperture in the pressure plate with a substantially rectangular shape and providing at least a lower part of the shank portion with a cross sectional shape which is similarly rectangular so as to be received by the aperture.

* * * * *

UNITED STATES PATENT AND TRADEMARK OFFICE
CERTIFICATE OF CORRECTION

PATENT NO. : 6,109,412
DATED : August 29, 2000
INVENTOR(S) : Cole et al.

It is certified that error appears in the above-identified patent and that said Letters Patent is hereby corrected as shown below:

Title page, item [73], assignee: Eaton Corporation

Signed and Sealed this

Twenty-fourth Day of April, 2001

Attest:

NICHOLAS P. GODICI

Attesting Officer

Acting Director of the United States Patent and Trademark Office